(12) United States Patent
Jin et al.

(10) Patent No.: US 11,105,312 B1
(45) Date of Patent: Aug. 31, 2021

(54) PENSTOCK INTERNAL MAINTENANCE SYSTEM AND PROCESS OF ASSEMBLING, ANCHOR UNIT

(71) Applicant: TRACTEL LTD., Scarborough (CA)

(72) Inventors: Anthony Jin, Scarborough (CA); Mar Mantuhac, Scarborough (CA); Leon Chen, Scarborough (CA); Matthew Gryniewski, Scarborough (CA); Jack Tadus, Scarborough (CA)

(73) Assignee: TRACTEL LTD., Ontario (CA)

( * ) Notice: Subject to any disclaimer, the term of this patent is extended or adjusted under 35 U.S.C. 154(b) by 0 days.

(21) Appl. No.: 16/907,892

(22) Filed: Jun. 22, 2020

(51) Int. Cl.
| | |
|---|---|
| *F03B 13/08* | (2006.01) |
| *E02B 9/02* | (2006.01) |
| *B66B 7/04* | (2006.01) |
| *B66B 11/00* | (2006.01) |
| *B66B 9/00* | (2006.01) |
| *F16L 55/18* | (2006.01) |
| *E03F 7/12* | (2006.01) |

(52) U.S. Cl.
CPC .............. *F03B 13/08* (2013.01); *B66B 7/046* (2013.01); *B66B 9/00* (2013.01); *B66B 11/0075* (2013.01); *E02B 9/022* (2013.01); *E03F 7/12* (2013.01); *F16L 55/18* (2013.01)

(58) Field of Classification Search
CPC . F03B 13/08; B66B 7/046; B66B 9/00; B66B 11/0075; E02B 9/022; B08B 2209/04; E03F 7/12; F16L 55/18; B66F 11/04; B61B 13/00
See application file for complete search history.

(56) References Cited

U.S. PATENT DOCUMENTS

| | | | | |
|---|---|---|---|---|
| 722,502 | A * | 3/1903 | Edison ....................... | B61J 3/04 104/183 |
| 3,603,264 | A * | 9/1971 | Von Arx ................ | G01M 3/005 104/138.2 |
| 4,319,142 | A * | 3/1982 | Mayo, Jr. .................. | E02B 9/00 290/52 |
| 6,632,475 | B1 * | 10/2003 | Bleggi .................... | B05B 3/027 118/302 |

(Continued)

FOREIGN PATENT DOCUMENTS

CN  201305437 Y  9/2009

*Primary Examiner* — Carib A Oquendo
(74) *Attorney, Agent, or Firm* — Nixon & Vanderhye

(57) ABSTRACT

In a penstock internal maintenance system, the penstock includes an inclined portion between upper and lower ends, the upper end arranged in an edifice including a water collecting chamber and a gate bearing structure allowing a gate to close the penstock, the gate bearing structure adjacent the water collecting chamber forming a vertical pit. The system includes a set of units assembled in an assembled configuration and separated in a dismounted configuration, the units including an anchor unit, a launching unit and a penstock inspection platform unit, the units in the dismounted configuration being enter the penstock through the gate bearing structure adjacent the water collecting chamber, the units are assembled when located in the penstock, the anchor unit slidingly received and retained in the gate bearing structure, the anchor unit having two lateral edges being guided and retained in two vertical lateral grooves of the gate bearing structure.

20 Claims, 17 Drawing Sheets

(56) References Cited

U.S. PATENT DOCUMENTS

Figure 1A:
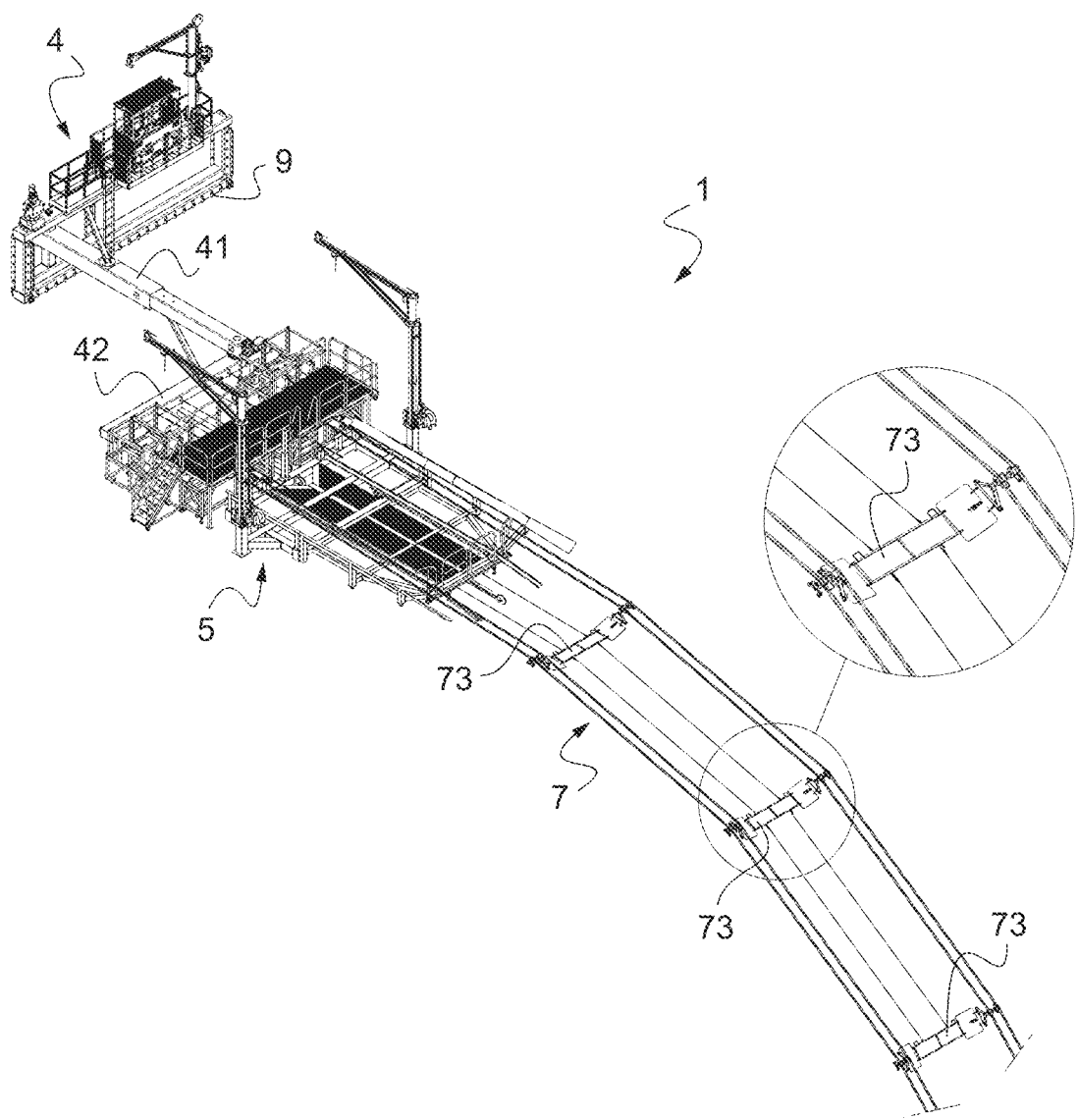

| | | | |
|---|---|---|---|
| 2003/0198519 A1* | 10/2003 | Fitzhardinge | F16L 55/26 405/184.1 |
| 2012/0039725 A1* | 2/2012 | Carlos | F04D 25/04 417/53 |
| 2019/0060965 A1* | 2/2019 | MacNeil | F16L 55/1658 |

* cited by examiner

PENSTOCK INTERNAL MAINTENANCE SYSTEM AND PROCESS OF ASSEMBLING, ANCHOR UNIT

TECHNICAL FIELD OF THE INVENTION

The invention relates to a penstock internal maintenance system and a process of assembling the system and also an anchor unit for the system. It has applications in the maintenance of hydroelectric plants and more precisely of the interior of a penstock of such plants.

BACKGROUND INFORMATION AND PRIOR ART

In hydroelectric plants using the potential energy of water, penstocks are conducting water from an upper end to a lower end where a turbine and an electric generator are installed. At the upper end of the penstock, an edifice is build and which comprises control means for controlling the flow of water traveling down the penstock, notably with a gate that can be opened to allow the water to flow down or closed to shut down the flow. Depending of the type of plant, a same penstock, in the edifice at the upper end, can be in relation to one or more ingress/supply of water and its/their gates. In general, the control means for each ingress or supply of water comprises more than one gate and more generally, more than one means to install a gate, as it could be necessary to provide a supplementary mean to shut down the flow in case the current gate would be accidentally inoperative. However, as in general one gate is sufficient to control the flow, the other means to install a gate has no gate and it can be used for other purpose, for example as a filter when a grid is installed in it, or even left unused.

The gates can be of any type and even different for a same ingress/supply of water to the penstock in the case it comprises more than one means to install a gate. In the simplest case, the gate is a simple flat panel/blade that can be slit down from the top of the edifice to be arranged in front or across the penstock and clog/close it. This last type of gate is inserted, slit down, and retained in a gate bearing structure of the edifice that forms a vertical rectangular pit that intercepts the penstock.

In hydroelectric plants of large capacity of electric production, the internal size of the penstock(s) can be sufficiently high to allow an operator to inspect and maintain it. It has therefore been proposed to send a platform with operator(s) from the upper end, down the penstock to maintain it internally. Document CN201305437Y is disclosing a platform that is moved in the penstock thanks to cables. However, it is necessary to strongly fasten the upper end of the cables to the penstock and that requires to interfere with the internal surface and wall of the penstock with fastening means but this not always possible due to the structure or material of the penstock wall. More generally, using fastening means interfering with the penstock wall is contrary to the principle that the internal wall of the penstock should be relatively smooth and uniform to avoid problems due to the action of the water flow, notably erosion, when it will be allowed to flow again.

The invention is intended to overcome the problems in relation to the installation of internal inspection and maintenance means in a penstock and that are used by operators having to move along the penstock.

SUMMARY OF THE INVENTION

Therefore, one object of the invention is to provide a penstock internal maintenance system adapted for an inclined penstock of an hydroelectric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at its two lateral edges in two vertical lateral groves of the gate bearing structure, wherein the system comprises a set of units that are assembled together to form an assembled configuration of the system and separated in a dismounted configuration of the system, said units comprising an anchor unit, a launching unit and a penstock inspection platform unit, the units in the dismounted configuration being configured to enter the penstock from the top of the edifice or, reversely leave the penstock, through the gate bearing structure adjacent to the water collecting chamber, when the eventual vertical plane device has been removed from the gate bearing structure, the units being assembled together when located in the penstock to obtain the assembled configuration, the anchor unit being further configured to be slidingly received and retained in the gate bearing structure adjacent to the water collecting chamber when the eventual vertical plane device has been removed from the gate bearing structure, the anchor unit having two lateral edges being guided and retained in the two vertical lateral groves of the gate bearing structure, in the assembled configuration of the system, the penstock inspection platform unit being parked on the launching unit when in a parking state and the penstock inspection platform unit being away of the launching unit, down the penstock, when in an operation state, the penstock inspection platform unit being linked to the anchor unit through the launching unit with cables allowing the penstock inspection platform unit to move away passively along the slope of the penstock by unwinding the cables or, reversely, move toward the launching unit by winding the cables, and wherein the launching unit is fastened to the anchor unit.

In various embodiments of the invention, the following means, which can be used alone or in any technically possible combination, are used:

- the penstock has a minimum transversal internal dimension of 2.5 m,
- the gate bearing structure adjacent to the water collecting chamber has a minimum width of 1 m as measured perpendicularly to a plane joining the two vertical lateral groves,
- the vertical plane device is for example a gate or a grating or a grid and can be replaced with the anchor unit,
- the two lateral edges of the anchor unit comprise rollers aligned vertically,
- the upper end comprises a water collecting chamber on a chamber side of the upper end and at least two successive gate bearing structures on a water supply side of the upper end, at least the gate bearing structure adjacent to the water collecting chamber is adapted to slidingly receive from the top of the edifice and retain a vertical plane device guided and retained at its two lateral edges in two vertical lateral groves of the gate bearing structure,
- the at least two successive gate bearing structures are arranged serially along the penstock, the upper end of the penstock comprising the water collecting chamber and the at least two successive gate bearing structures is sensibly level/horizontal, the lower end of the penstock is sensibly level/horizontal, the part of the penstock between the upper end and the lower end is inclined, the penstock has a maximum transverse internal dimension of 25 m, the penstock has a part that is tubular between the upper end and the lower end, the tubular part of the penstock has a minimum internal diameter of 2.5 m, the tubular part of the penstock has a maximum internal diameter of 25 m, the gate bearing structure adjacent to the water collecting chamber has a minimum width of 1.5 m as measured perpendicular to the plane joining the two vertical lateral groves, the gate bearing structure adjacent to the water collecting chamber has a maximum width of 3 m as measured perpendicular to the plane joining the two vertical lateral groves, the gate bearing structure adjacent to the water collecting chamber has a sensibly rectangular horizontal cross section at least towards the top of the edifice, in the assembled configuration of the system, the anchor unit is arranged at the bottom of the gate bearing structure, the launching unit comprises at least one davit, the anchor unit is an integral unit and each of the launching unit and of the penstock inspection platform unit is made of separate elements in the dismounted configuration of the system, the penstock inspection platform unit comprises rollers configured to roll on the internal surface of the penstock when in operation state and to roll and rest on rolling guides of the launching unit in the parking state, the rolling guides of the launching unit are hinged and can be set in at least two position, an horizontal position and an inclined position, the horizontal position corresponding to the parking state and the inclined position allowing the penstock inspection platform unit to leave passively the launching unit toward the inclined penstock or to return on the launching unit from the inclined penstock, the penstock inspection platform unit comprises a telescopic leveling system, the penstock inspection platform unit comprises a platform resting on at least three feet, the feet being adjustable to keep the platform sensibly level/horizontal in the parking state or in the operation state, at least one foot is a telescopic foot, at least one foot is inclinable relative to the platform, the penstock inspection platform unit comprises a platform resting on three feet, the penstock inspection platform unit comprises a platform resting on at least four feet, the penstock inspection platform unit comprises a platform resting on four feet, the penstock inspection platform unit is supplied with electric current remotely from the upper end of the penstock with an electric cord and the penstock inspection platform unit comprises a winder of the electric cord allowing to unwind the electric cord when the penstock inspection platform unit moves down in the penstock and, conversely, to wind the electric cord when the penstock inspection platform unit moves up in the penstock, the penstock inspection platform unit is supplied with electric current remotely from the lower end of the penstock with an electric cord and the penstock inspection platform unit comprises a winder of the electric cord allowing to wind the electric cord when the penstock inspection platform unit moves down in the penstock and, conversely, to unwind the electric cord when the penstock inspection platform unit moves up in the penstock, the platform of the penstock inspection platform unit comprises peripheral rail guards, the platform of the penstock inspection platform unit comprises an access hatch for accessing the underside of the platform, the penstock inspection platform unit comprises lifelines, the system comprises control panels and, possibly, remote control devices, for controlling the operations of the units, the penstock inspection platform unit comprises a platform resting on a supporting frame comprising the rollers of the penstock inspection platform unit and the frame is inclinable relative to the platform to keep the platform sensibly level/horizontal in the parking state or in the operation state, the penstock inspection platform unit comprises at least one davit, the penstock inspection platform unit comprises a control panels and, possibly, remote control devices, for controlling the operations of the penstock inspection platform unit, in the operation state, the cables linking the penstock inspection platform unit and the launching unit are resting on guide sheave rollers to avoid the cables rubbing against penstock internal surface, the rollers of the guide sheave rollers can roll on the internal surface of the penstock, the rollers of the guide sheave rollers can be locked to stop rolling or unlocked to free the rolling, the base of the guide sheave roller can be fastened on the internal surface of the penstock, the base of the guide sheave roller can be fastened on the internal surface of the penstock, with magnets and/or welding and/or fasteners, the internal surface of the penstock on which the guide sheave roller can be fastened, is made of concrete, the internal surface of the penstock on which the guide sheave roller can be fastened, is made of metal, the guide sheave rollers comprise rotating pulleys on which the cables are resting, the cables being retained on the guide sheave rollers free to roll on the pulleys, the guide sheave rollers comprise tubes in which the cables are resting, the cables being retained on the guide sheave rollers free to slide in the tubes, the cables are fixed to the guide sheave rollers and the rollers of the guide sheave rollers can roll on the internal surface of the penstock, the guide sheave rollers are forming a chain, each guide sheave roller being linked to the adjacent one and the chain being fixed to the anchor unit, the system further comprises a shuttle platform unit linked with independent suspension line wire ropes to at least the launching unit and capable of moving between the penstock inspection platform unit and the launching unit when the system is in operation state, the shuttle platform unit is linked with suspension line wire ropes to the launching unit, the shuttle platform unit is linked with suspension line wire ropes to the anchor beam and through the launching unit, the movements of the shuttle platform unit between the penstock inspection platform unit and the launching unit are obtained by winding and unwinding the suspension line wire ropes linking the shuttle platform unit to the launching unit and/or to the anchor beam, the winding and unwinding of the suspension line wire ropes is done thanks to at least one electric winder arranged on the shuttle platform unit, the winding and unwinding of the suspension line wire ropes is done thanks to at least one electric winder arranged on the launching unit or on the anchor beam, the shuttle platform unit comprises rollers configured to roll on the internal surface of the penstock, the rollers of the shuttle platform unit are located laterally to the cables linking the penstock inspection platform unit to the launching unit, the rollers of the shuttle platform unit are located between the cables linking the penstock inspection platform unit to the launching unit and each guide sheave roller comprises plates on which the rollers of the shuttle platform unit can roll to cross the guide sheave roller, the rollers of the shuttle platform unit are on feet of the shuttle platform unit, the rollers are at the ends of the feet, the shuttle platform unit comprises a platform resting on at least three feet, the feet being adjustable to keep the platform sensibly level/horizontal along the penstock, at least one foot of the shuttle platform unit is a telescopic foot, at least one foot of the shuttle platform unit is inclinable relative to the platform, the shuttle platform unit comprises a platform resting on three feet, the shuttle platform unit comprises a platform resting on at least four feet, the shuttle platform unit comprises a platform resting on four feet, the shuttle platform unit comprises a platform resting on a supporting frame comprising the rollers of the shuttle platform unit and the frame is inclinable relative to the platform to keep the platform sensibly level/horizontal along the penstock, the shuttle platform unit comprises a control panels and, possibly, remote control devices, for controlling the operations of the shuttle platform unit, the shuttle platform unit comprises a telescopic leveling system, the anchor unit comprises a deployable telescopic arm terminated by an anchor beam, cables and the launching unit being attached to the anchor beam in the assembled configuration of the system, the deployable telescopic arm and the anchor beam of the anchor unit are retracted within the width of the anchor unit in the dismounted configuration of the system, the anchor unit is arranged on a girder at the bottom of the gate bearing structure, at least one of the deployable telescopic arm and anchor beam is actionable with an electric motor, at least one of the deployable telescopic arm and anchor beam is actionable with a hydraulic pressurized fluid, the anchor unit comprises a davit, the anchor unit comprises a walkway on its upper face, the walkway of the anchor unit is surrounded with guard rails, the anchor unit comprises at least one lifeline, the launching unit comprises a hoist section and a launching section connected together in the assembled configuration of the system, the hoist section being attached to the anchor beam, the launching unit comprises a hoist section, a guide sheave section and a launching section connected together the assembled configuration of the system, the hoist section being attached to the anchor beam, and the guide sheave section is connected to the hoist section and the launching section is connected to the guide sheave section, some of the elements are preassembled modules, each of the elements and modules has a size allowing it to pass through the gate bearing structure, the launching unit is made of separate elements in the dismounted configuration of the system and the hoist section is an assembly of preassembled hoist frame modules, the hoist section comprises electric winders for winding and unwinding the cables, each preassembled hoist frame module comprises one electric winder, the launching unit is made of separate elements in the dismounted configuration of the system and the guide sheave section is an assembly of preassembled guide sheave frame modules, the guide sheave section comprises pulleys whose locations are adjustable in order to adjust the position of the cables relative to the penstock inclined section, the hoist section comprises electric winders for winding and unwinding the cables and the guide sheave section comprises pulleys whose locations are adjustable in order to adjust the position of the cables relative to the penstock inclined section.

A further object of the invention is to provide a process of assembling a penstock internal maintenance system from a dismounted configuration of the system in order to obtain an assembled configuration of the system, wherein the penstock internal maintenance system is according to anyone of claims 1 to 14 and in which the system comprises a set of units that are assembled together to form an assembled configuration of the system and separated in a dismounted configuration of the system, said units comprising an anchor unit, a launching unit and a penstock inspection platform unit, the penstock being an inclined penstock of an hydroelectric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at its two lateral edges in two vertical lateral groves of the gate bearing structure, wherein if present, the vertical plane device is first removed from the gate bearing structure adjacent to the water collecting chamber, and wherein the anchor unit, the launching unit and the penstock inspection platform unit are entered from the top of the edifice in the penstock through the gate bearing structure adjacent to the water collecting chamber, the anchor unit being further configured to be slidingly received and retained in the gate bearing structure, the anchor unit having two lateral edges being guided and retained in the two vertical lateral groves of the gate bearing structure, wherein the launching unit is fastened to the anchor unit and the penstock inspection platform unit is parked on the launching unit, the penstock inspection platform unit being linked to the anchor unit through the launching unit with cables allowing the penstock inspection platform unit to move away passively along the slope of the penstock by unwinding the cables or, reversely, move toward the launching unit by winding the cables.

In various embodiments of the process of assembling a penstock internal maintenance system, the penstock has a minimum transversal internal dimension of 2.5 m, and/or the gate bearing structure adjacent to the water collecting chamber has a minimum width of 1 m as measured perpendicularly to a plane joining the two vertical lateral groves.

A still further object of the invention is to provide an anchor unit for a penstock internal maintenance system adapted for the maintenance of an inclined penstock of an hydroelectric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at its two lateral edges in two vertical lateral groves of the gate bearing structure, the system comprises a set of units including the anchor unit that are assembled together to form an assembled configuration of the system and separated in a dismounted configuration of the system, the anchor unit in the dismounted configuration being configured to enter the penstock from the top of the edifice or, reversely leave the penstock, through the gate bearing structure adjacent to the water collecting chamber when the eventual vertical plane device has been removed from the gate bearing structure, the anchor unit being further configured to be slidingly received and retained in the gate bearing structure adjacent to the water collecting chamber, the anchor unit having two lateral edges being guided and retained in the two vertical lateral groves of the gate bearing structure, and wherein the anchor unit comprises a deployable telescopic arm terminated by an anchor beam, the deployable telescopic arm and the anchor beam of the anchor unit being retracted within the width of the anchor unit in the dismounted configuration of the system.

In various embodiments of the anchor unit, the penstock has a minimum transversal internal dimension of 2.5 m, and/or the gate bearing structure adjacent to the water collecting chamber has a minimum width of 1 m as measured perpendicularly to a plane joining the two vertical lateral groves.

The following description in relation with the appended drawings, given by way of non-limitative example, will allow a good understanding of what the invention consists of and of how it can be implemented.

Figure 1B:
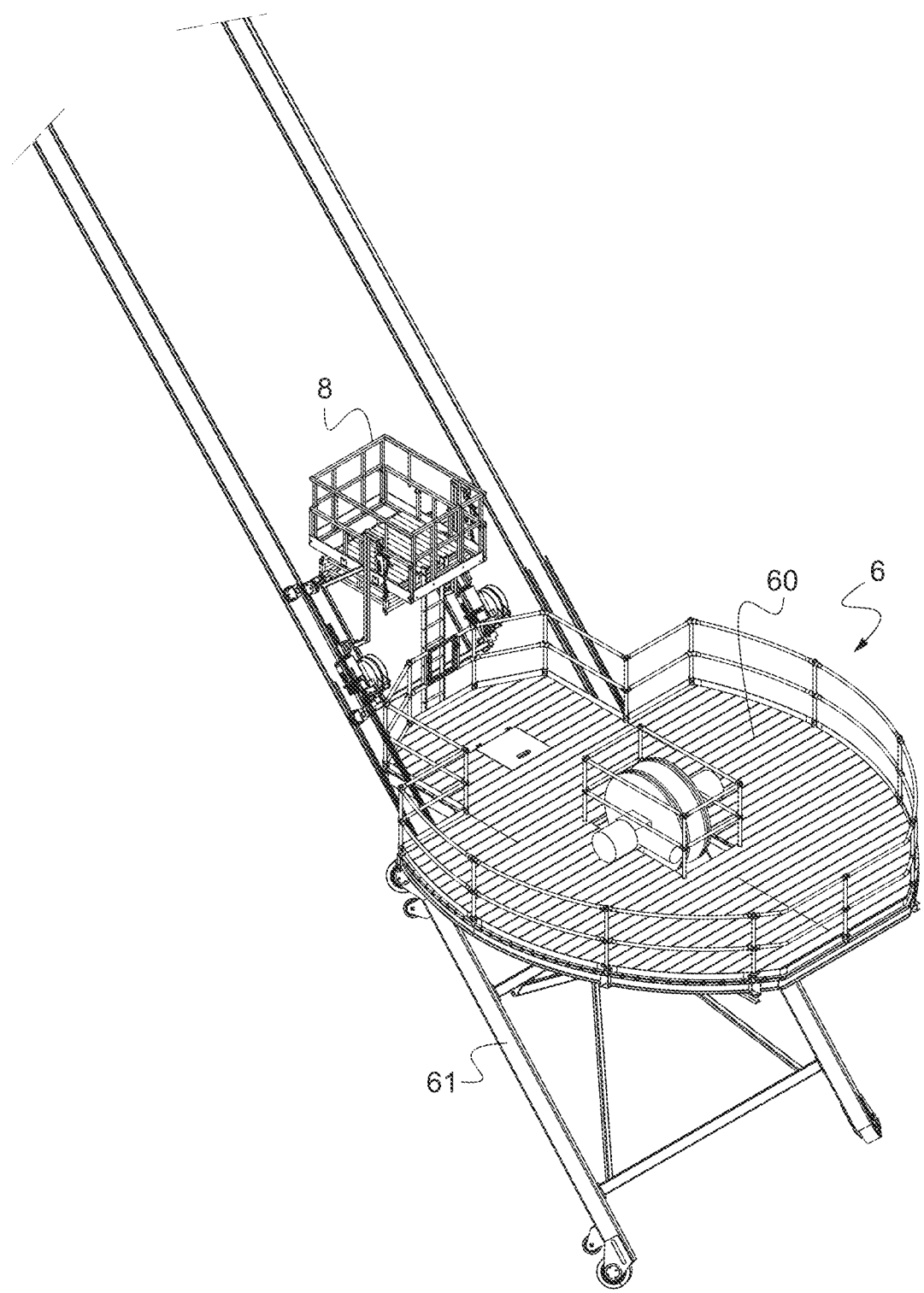
Figure 2:
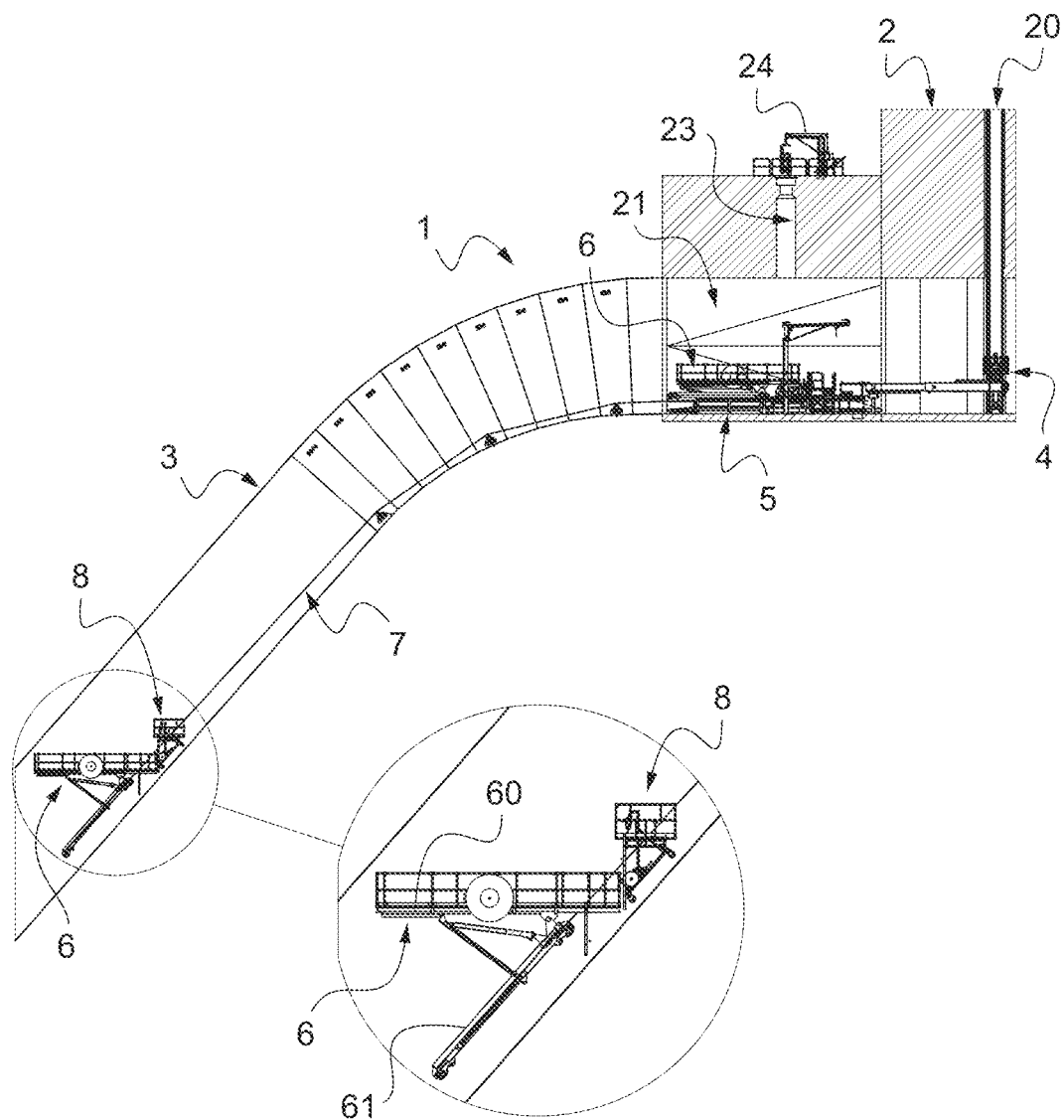
Figure 3:
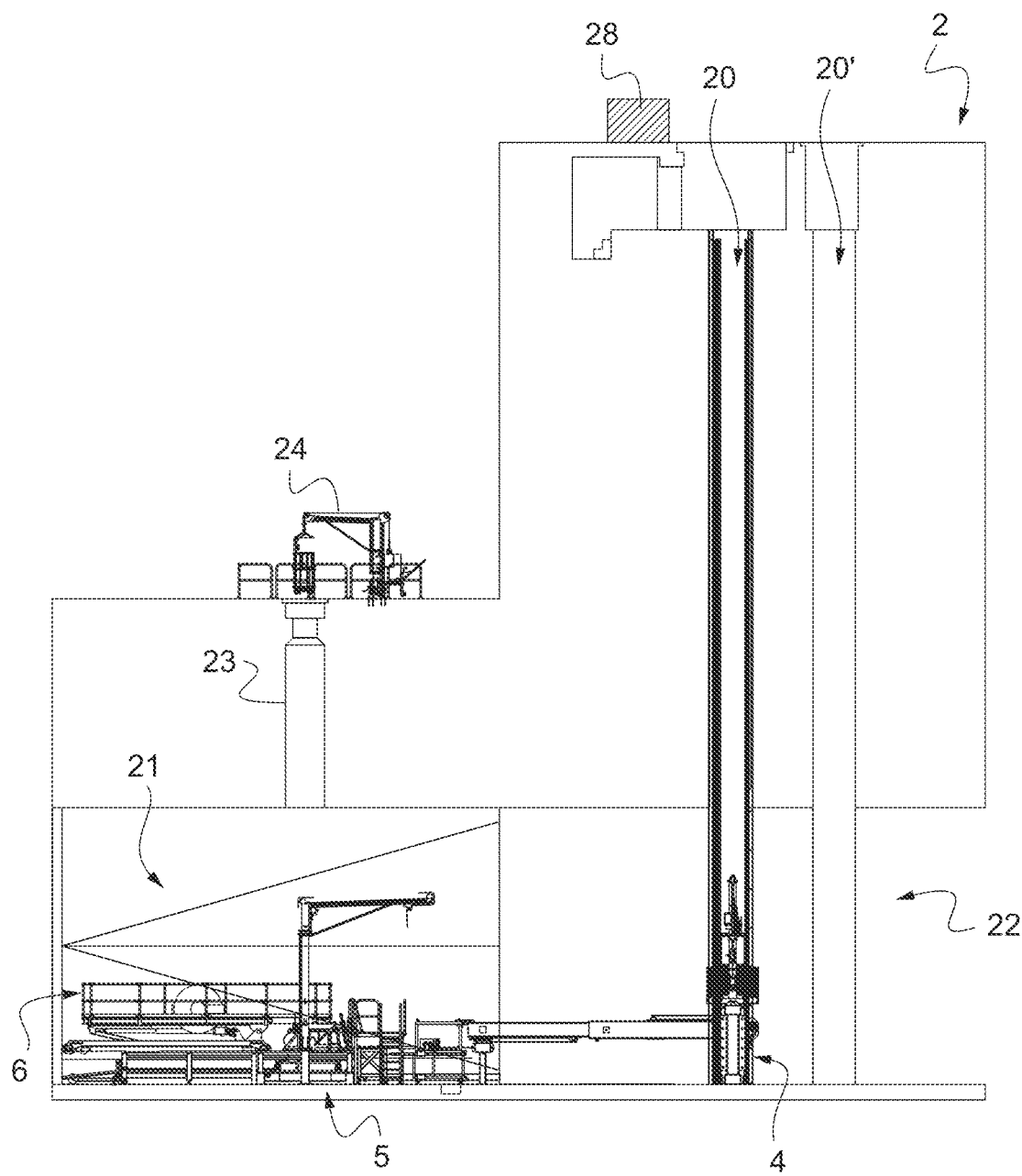
Figure 4:
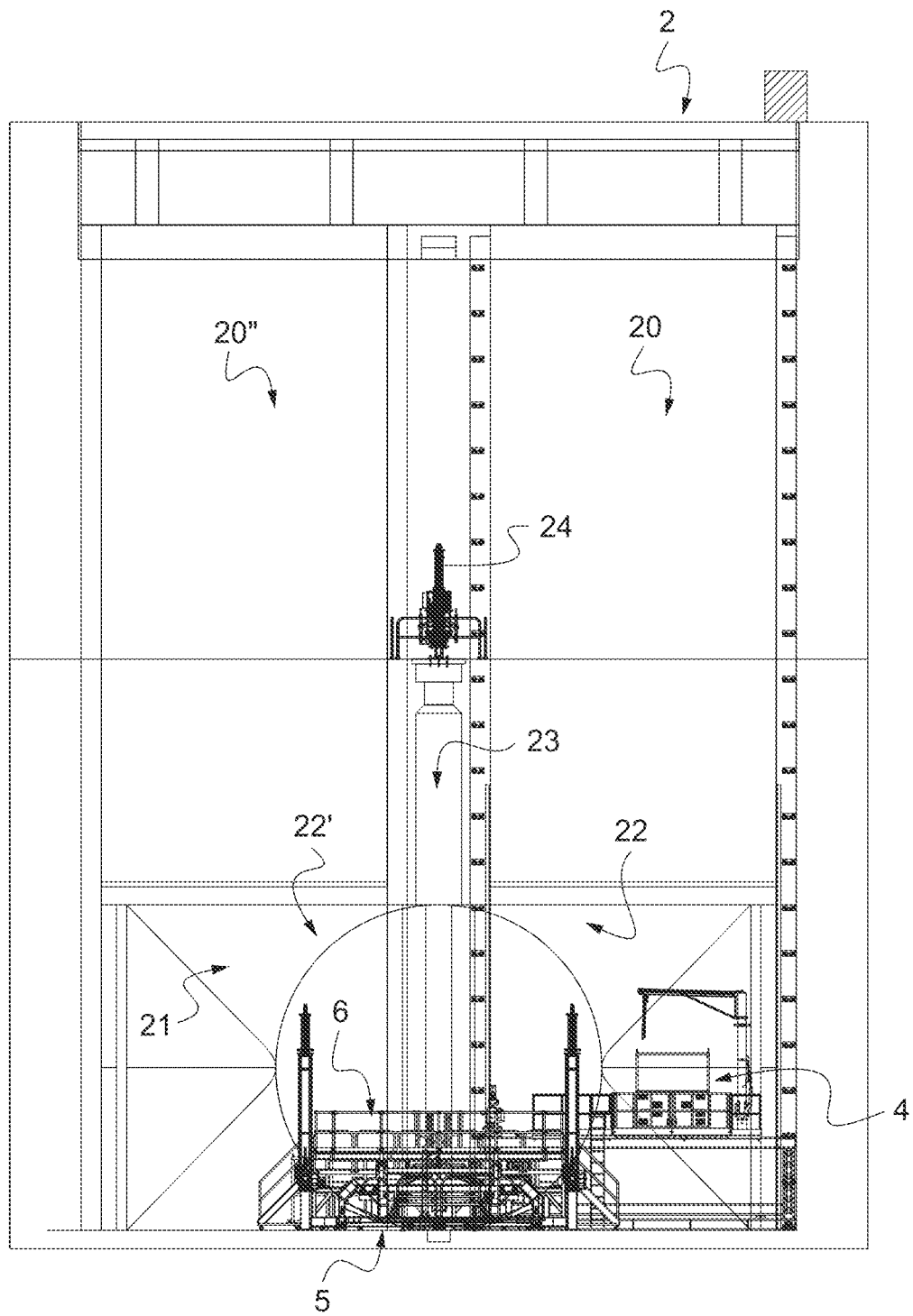
Figure 5:
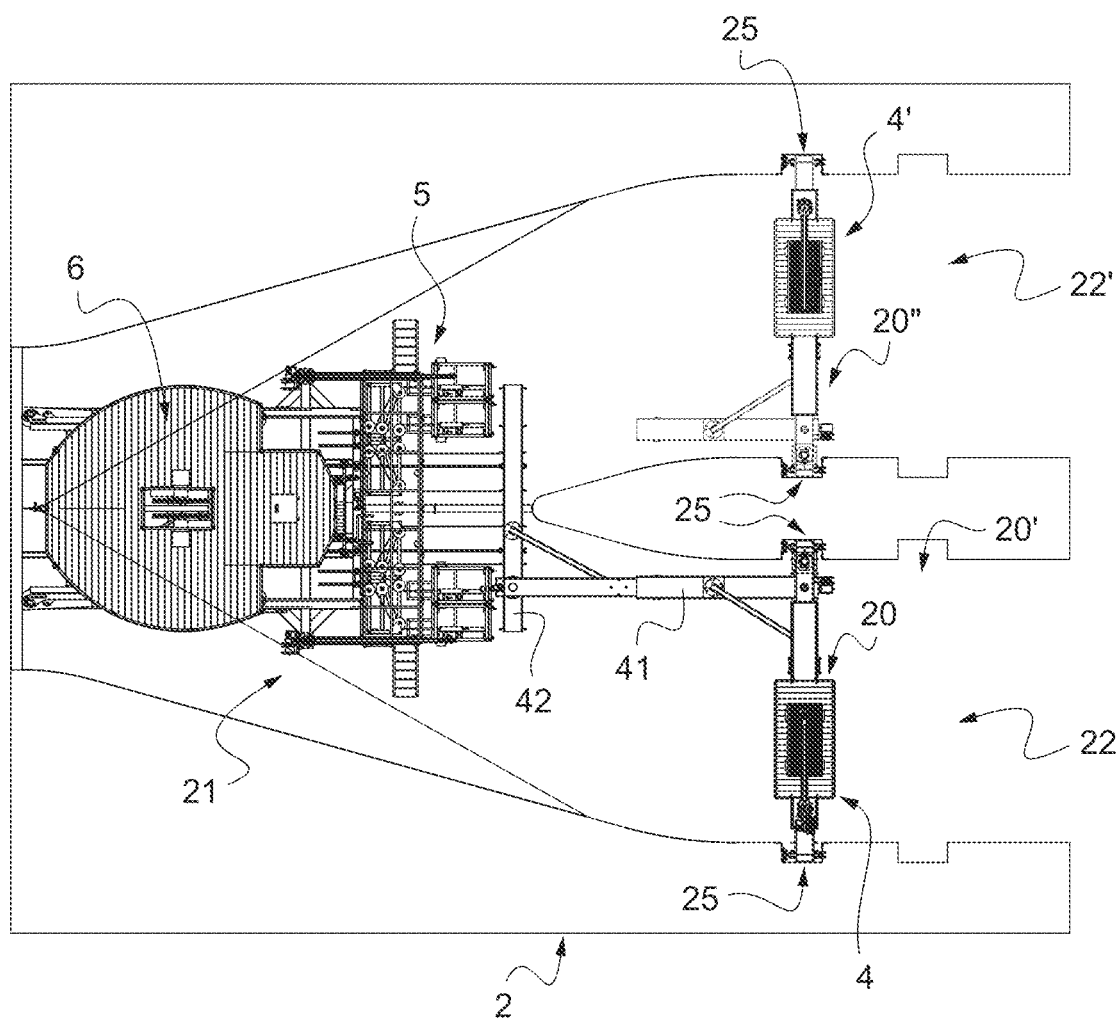
Figure 6:
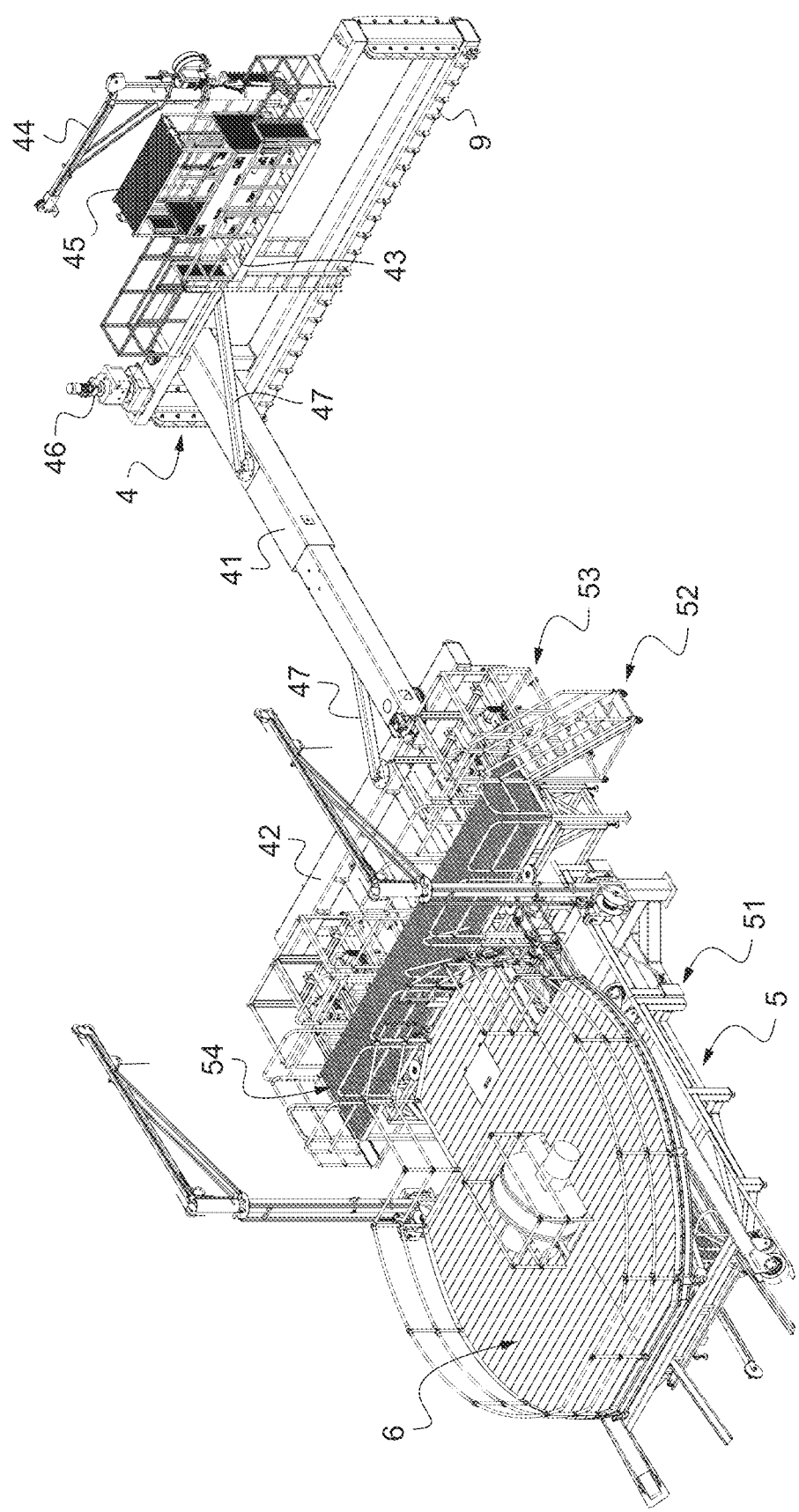
Figure 7:
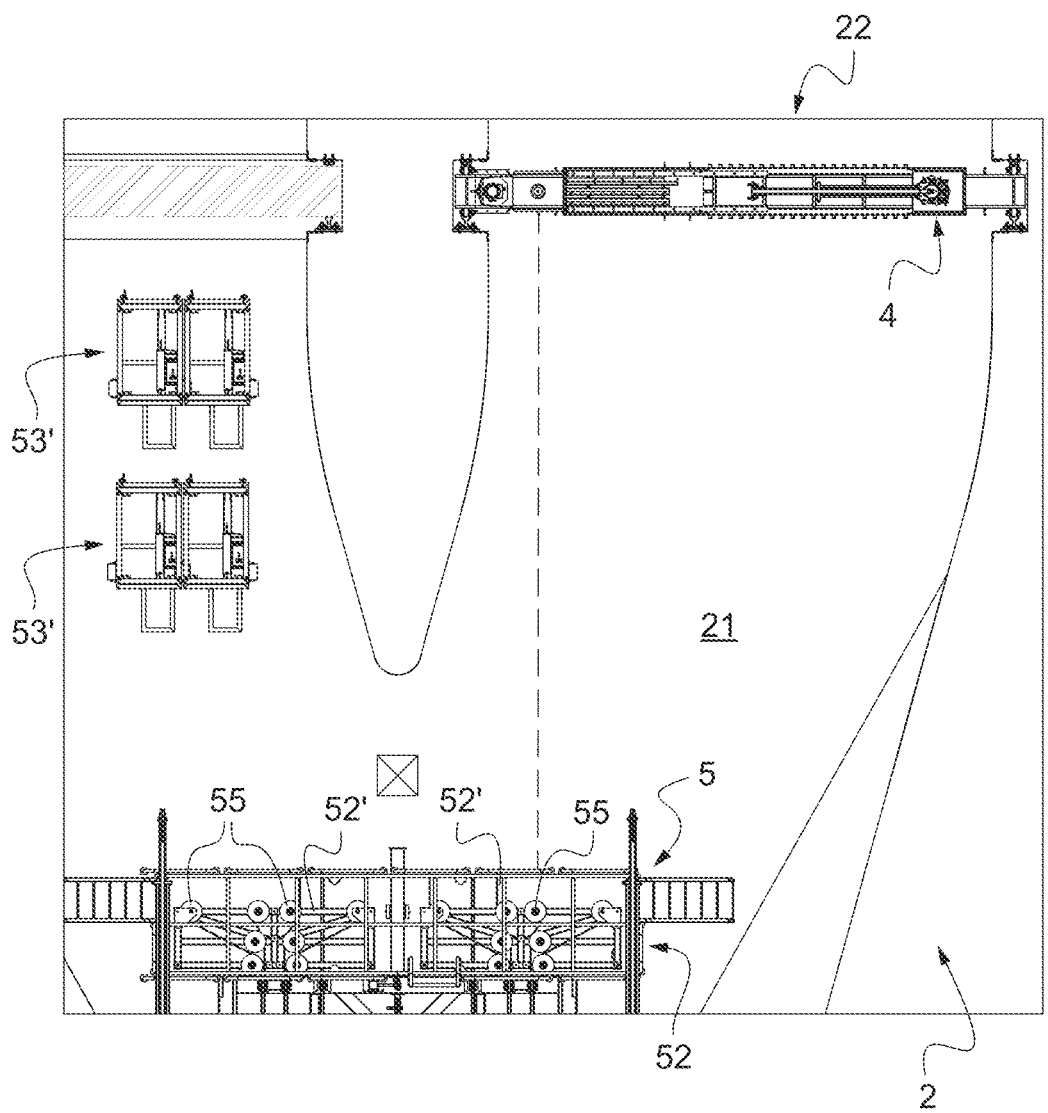
Figure 8:
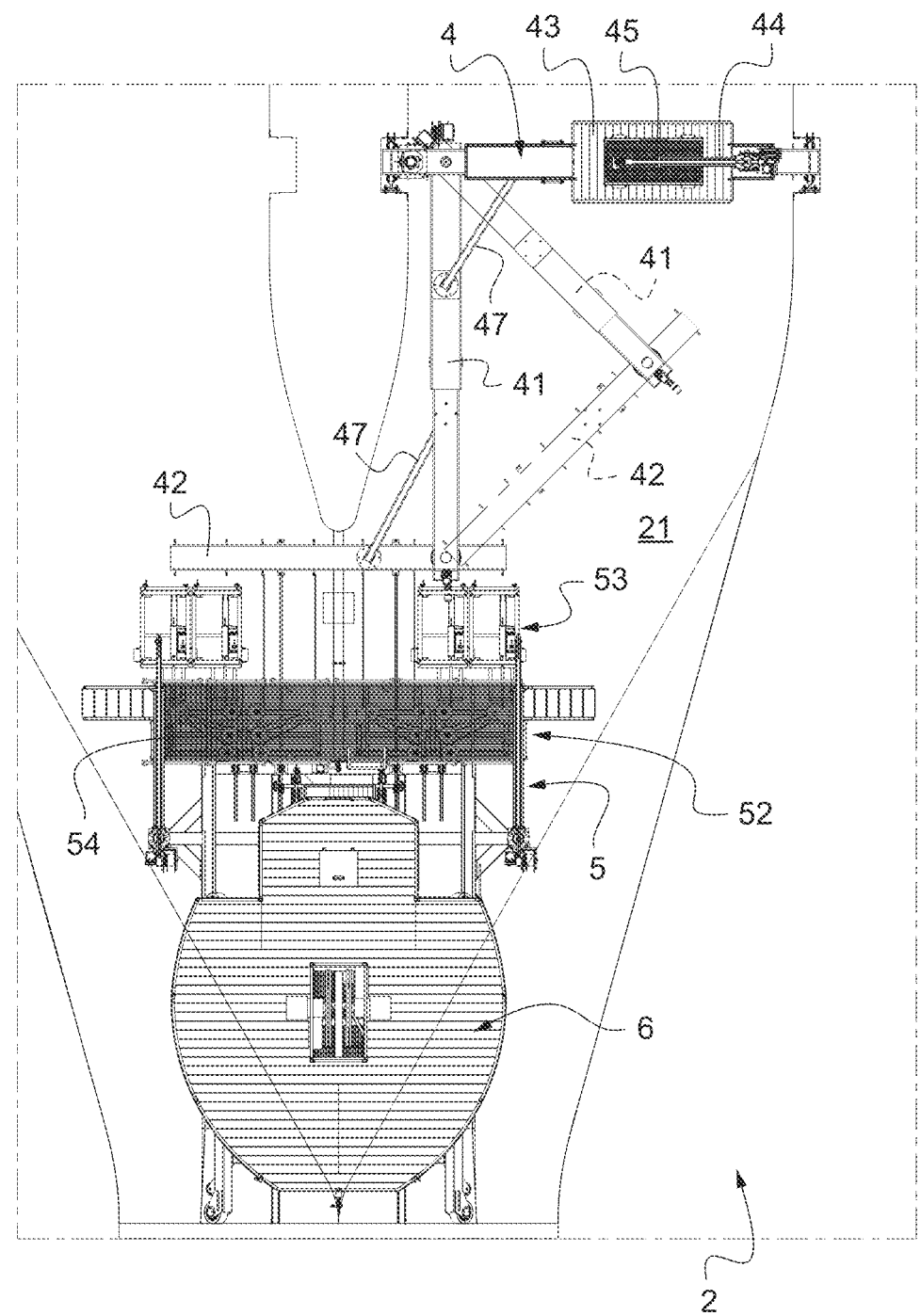
Figure 9:
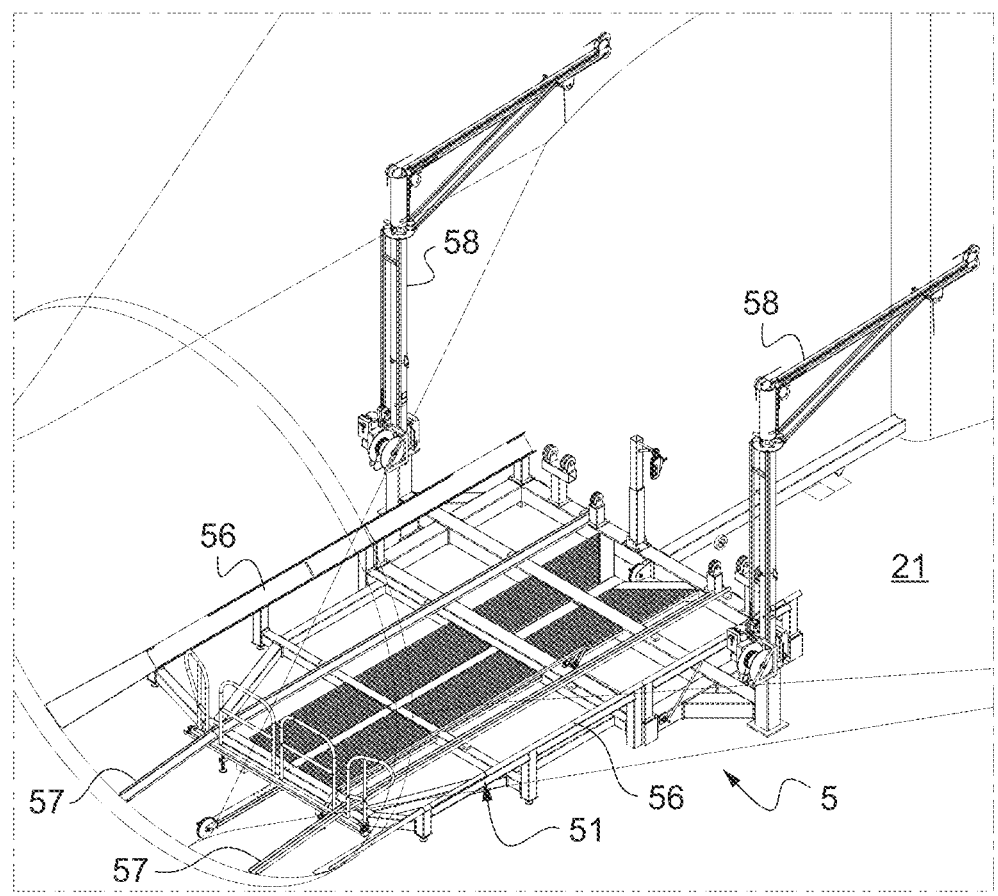
Figure 10:
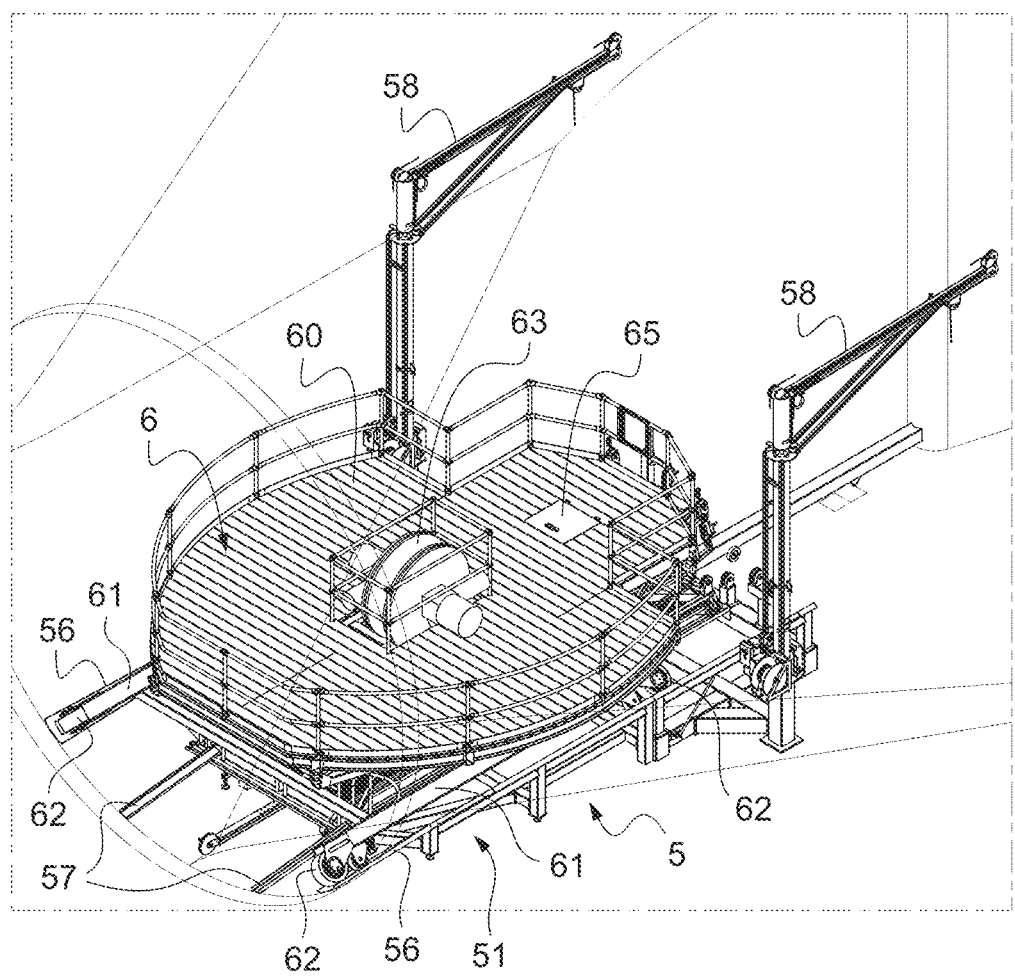
Figure 11:
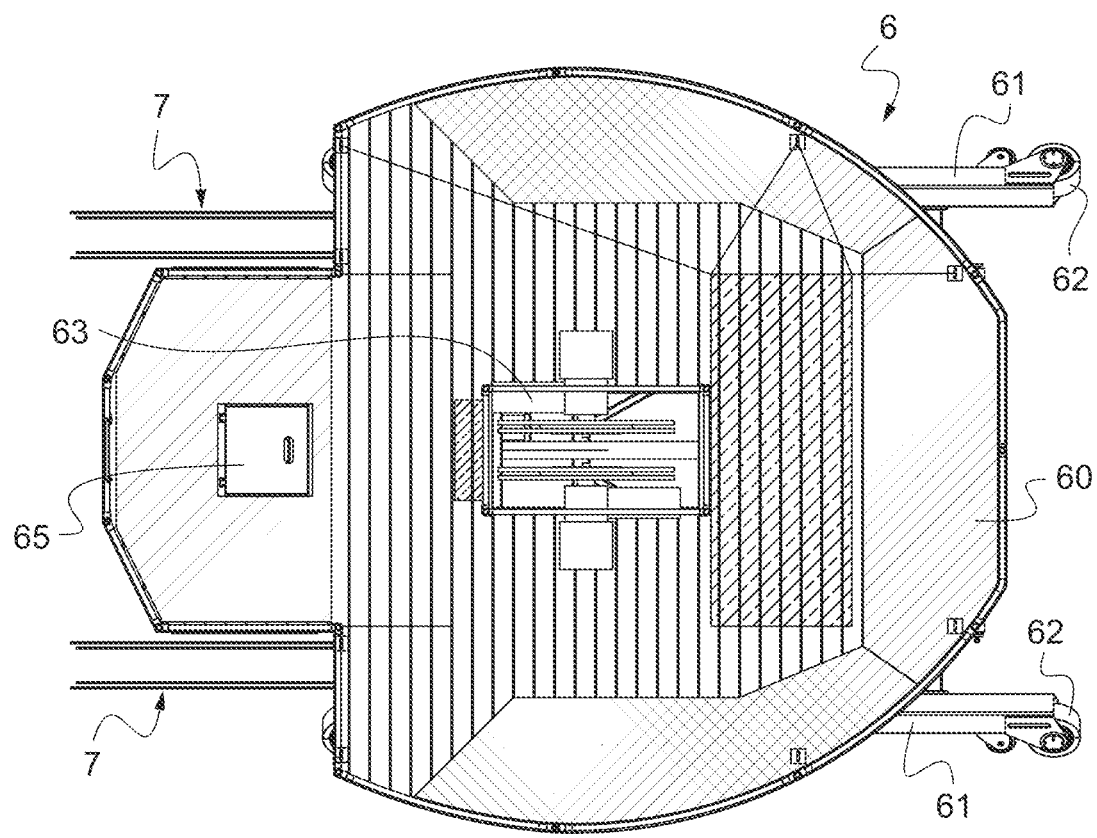
Figure 12:
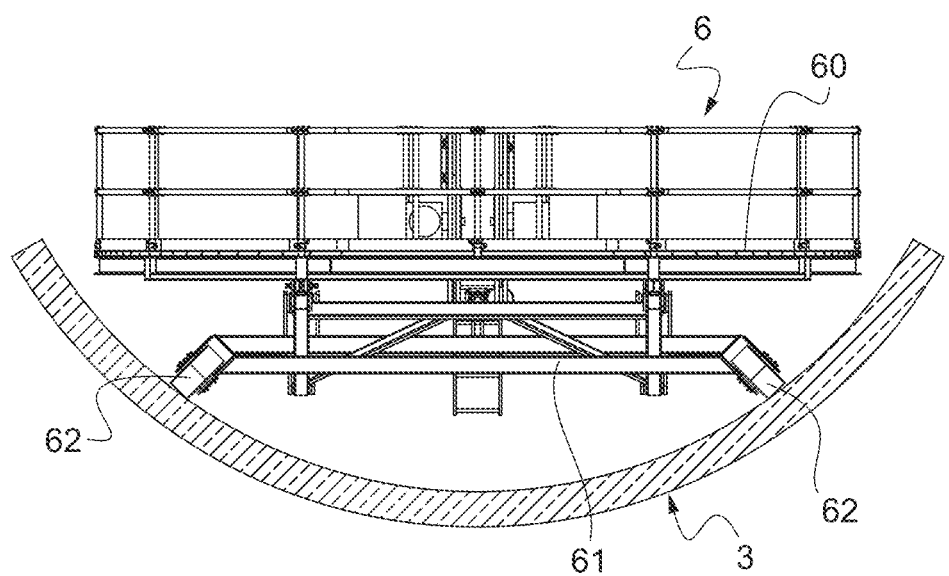
Figure 13:
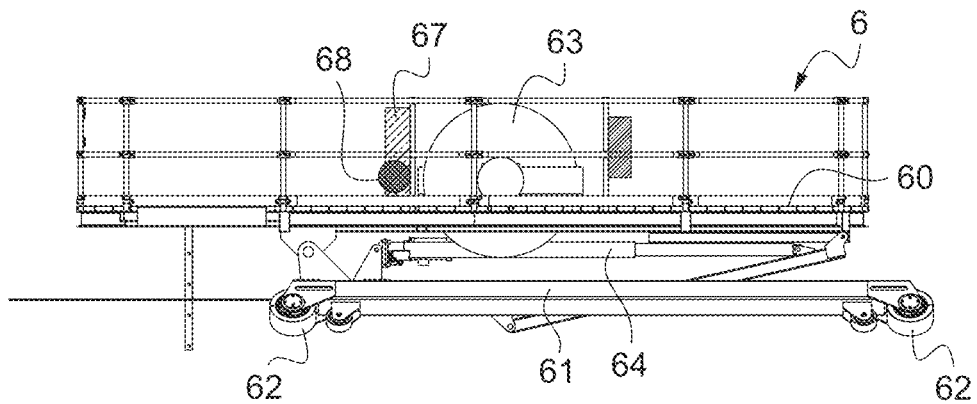
Figure 14:
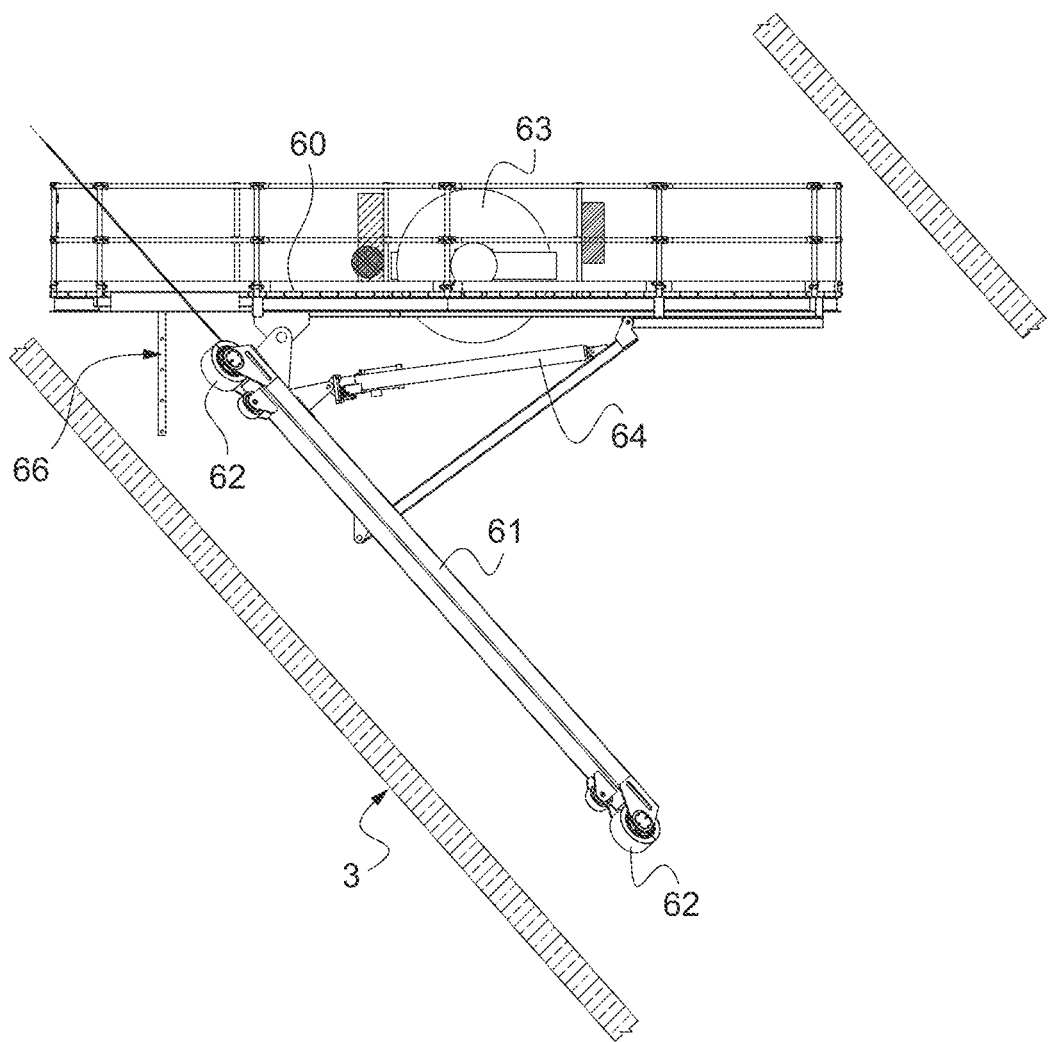
Figure 15:
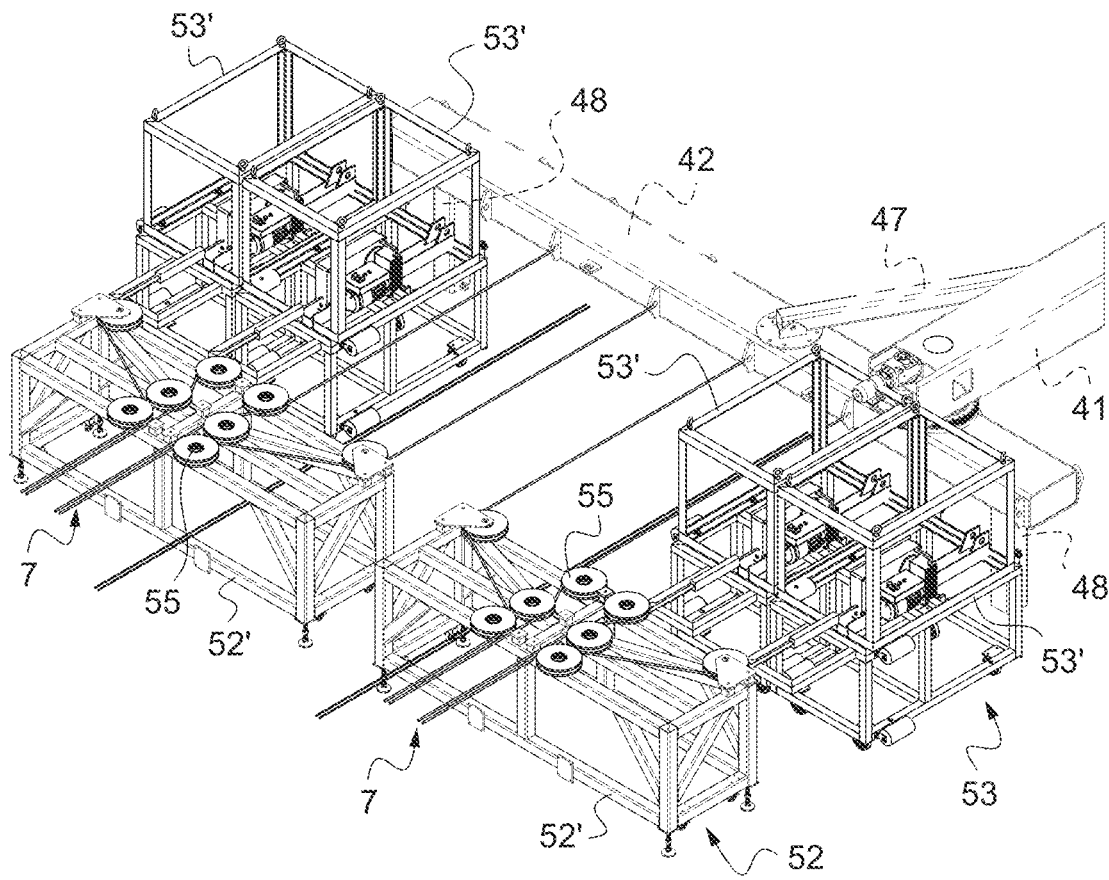
Figure 16:
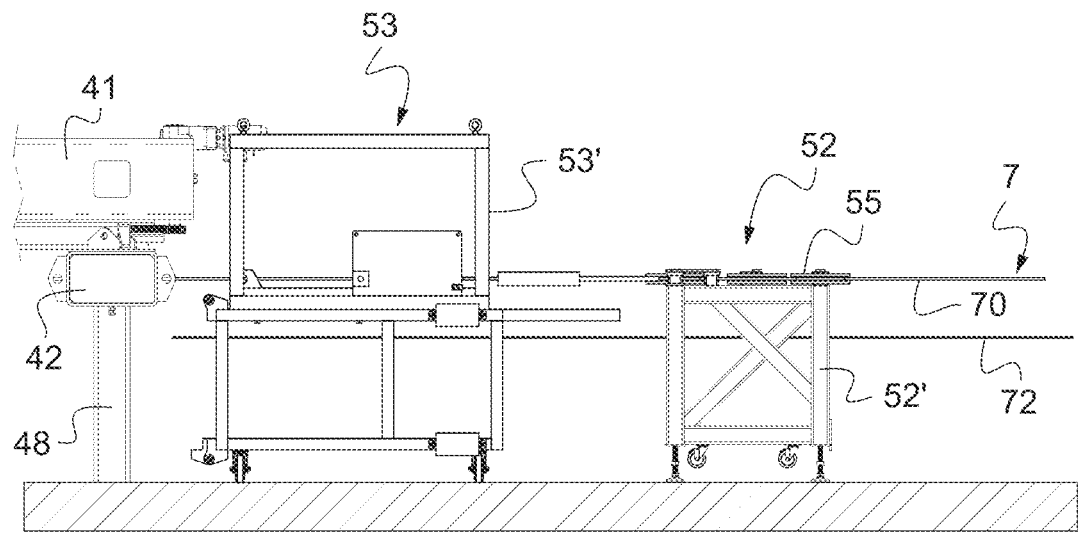
Figure 17:
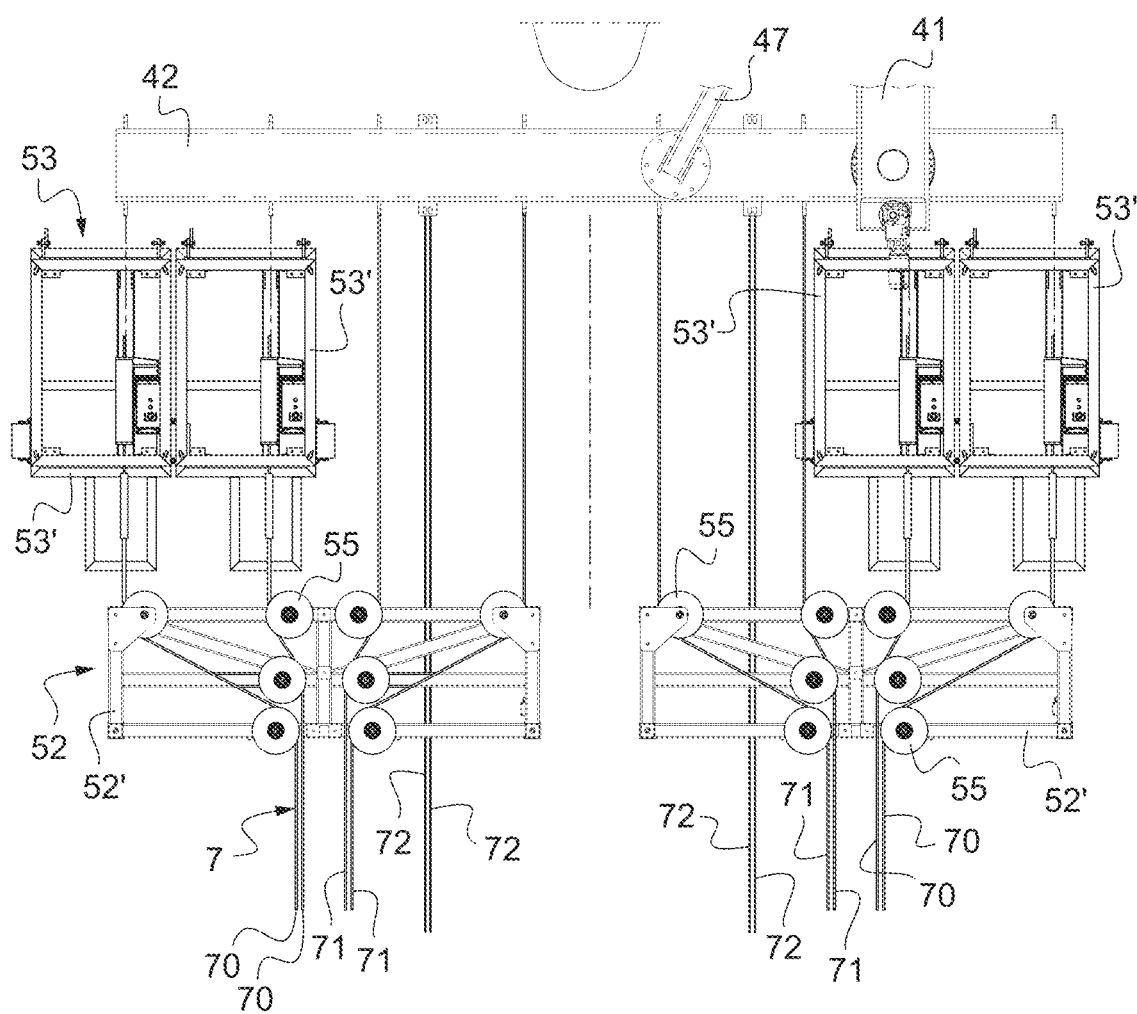
Figure 18:
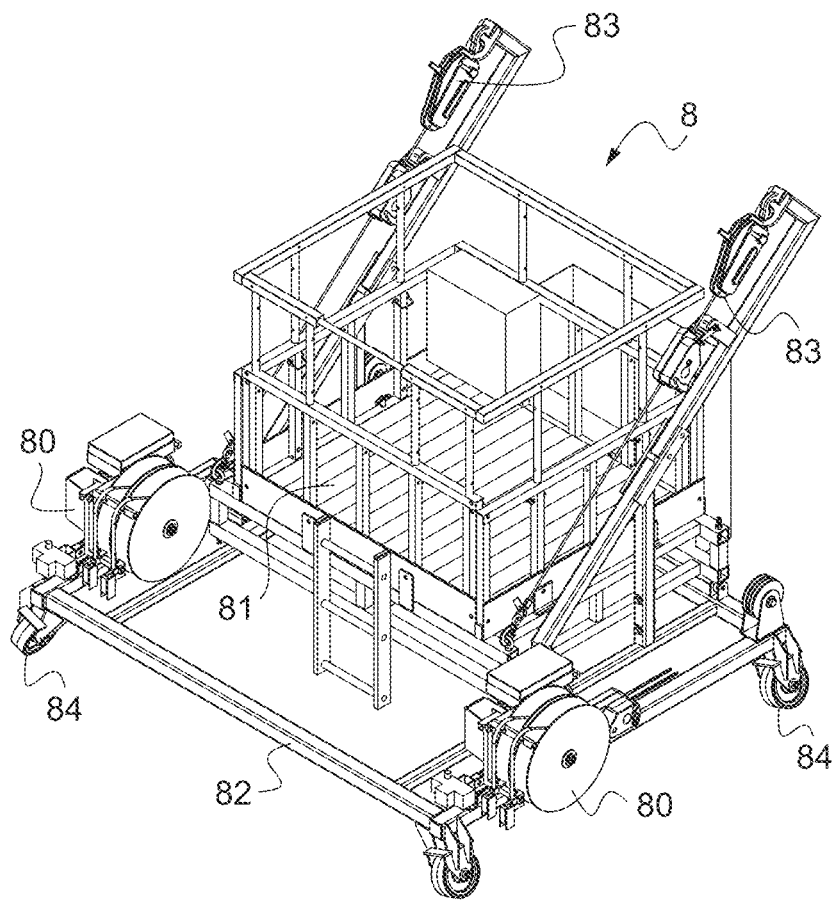
Figure 19:
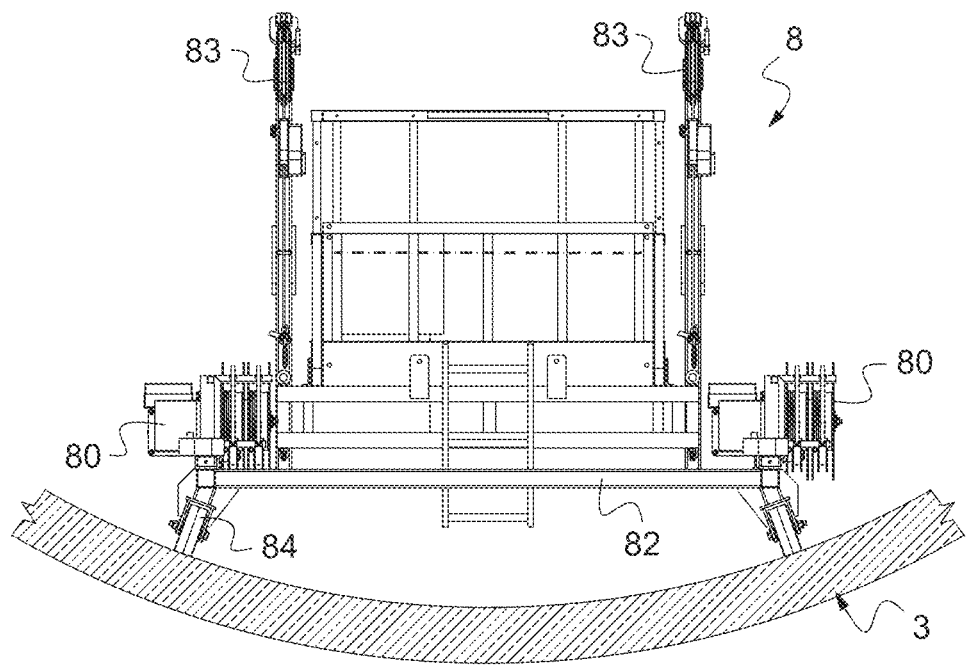
Figure 20:
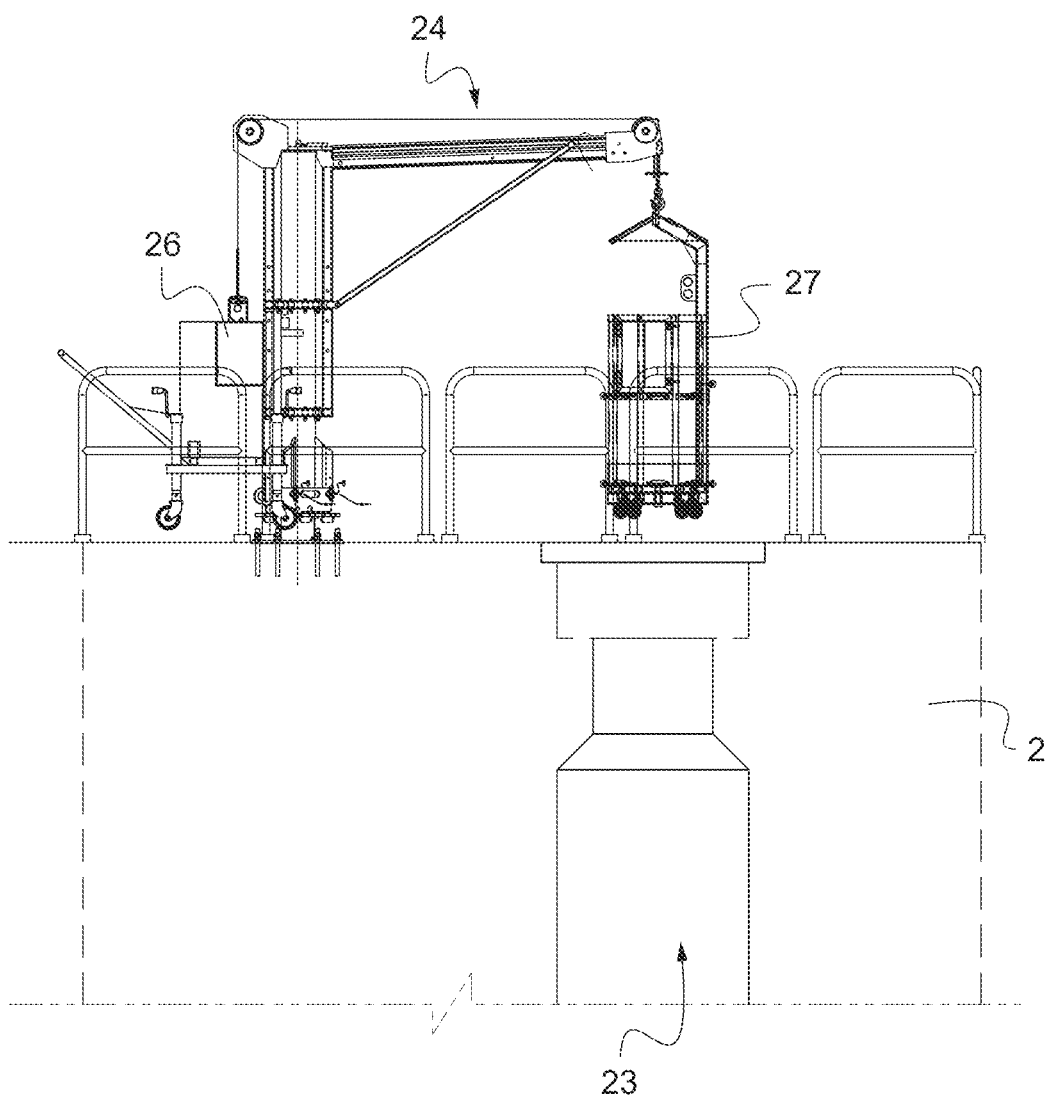

In the appended drawings:

FIGS. 1a and 1b are perspective views of the system in an assembled configuration and in an operation state, FIG. 2 is a lateral view of the system in assembled configuration and in both operation state (penstock inspection platform unit away down from the launching unit) and parking state (penstock inspection platform unit parked on the launching unit), in relation to the penstock and the edifice at the upper end of the penstock, FIG. 3 is a lateral view of the system in assembled configuration and in parking state, in relation to the edifice at the upper end of the penstock, FIG. 4 is a front view from the side of the penstock, of the system in assembled configuration and in parking state, in relation to the edifice at the upper end of the penstock, FIG. 5 is a downward view from the top of the water collecting chamber, of the system in the assembled configuration and in the parking state, in relation to the edifice at the upper end of the penstock, FIG. 6 is a perspective detailed view of the system in the assembled configuration and in the parking state, FIG. 7 is a downward view from the top of the water collecting chamber, of the system that is not fully assembled, in relation to the edifice at the upper end of the penstock, FIG. 8 is a downward view from the top of the water collecting chamber, of the system that is in the assembled configuration, in relation to the edifice at the upper end of the penstock, to show the way the deployable telescopic arm and the anchor beam of the anchor unit deploy, FIG. 9 is a perspective detailed view of the launching section of the not fully assembled launching unit, FIG. 10 is a perspective detailed view of the launching section of the not fully assembled launching unit with the penstock inspection platform unit parked on it, FIG. 11 is a downward view from the top of the penstock inspection platform unit, FIG. 12 is a front view of the penstock inspection platform unit in relation to the penstock, FIG. 13 is a lateral view of the penstock inspection platform unit, FIG. 14 is a lateral view of the penstock inspection platform unit with its frame inclined to have its platform sensibly level/horizontal and in relation to the penstock inclined portion, FIG. 15 is a perspective detailed view of the hoist section and of the guide sheave section of the not fully assembled launching unit, the hoist section being attached to the anchor beam, FIG. 16 is a side view of the hoist section, guide sheave section and anchor beam of FIG. 15, FIG. 17 is a downward view of the hoist section, guide sheave section and anchor beam of FIG. 15, FIG. 18 is a perspective detailed view of the shuttle unit, FIG. 19 is a front view of the shuttle unit, in relation to the penstock, and FIG. 20 is a lateral view of the access pit in the top of the edifice at the upper end of the penstock with a davit, a hoist, and a basket elevator.

DETAILED DESCRIPTION OF EXAMPLE(S)

The exemplified penstock used to describe the system comprises an upper end, an inclined portion, and a lower end. The upper end of the penstock is comprised in an edifice that comprises means to control the flow of water in the form of gates operable in gate bearing structures. The upper end of the internal space of the penstock consists also of a water collecting chamber and an ingress/supply of water side and is sensibly horizontal and with a sensibly flat ground. The penstock has a square or rectangular cross-section in the area where the gates and the gate bearing structures are located and has a circular cross-section in its inclined portion, the water collecting chamber being at the interface of those two main types of cross-sections.

The penstock internal maintenance system 1 of FIGS. 1a and 1b, consists of three main items: an anchor unit 4, a launching unit 5 and a penstock inspection platform unit 6. Preferably, as represented, a shuttle unit 8 is added to the system.

The anchor unit 4 is used to anchor and fix the whole system 1 in the penstock using means readily available at the upper end of the penstock 3. Thanks to the anchor unit 4 there is no need to create or install specific fastening means in the penstock. The launching unit 5 is attached to the anchor unit 4 through a deployable telescopic arm 41 and an anchor beam 42 of the anchor unit 4. In the operation state as represented, the penstock inspection platform unit 6 has moved away the launching unit 5 down the penstock 3 passively: the weight of the penstock inspection platform unit 6 and the incline of the penstock inclined portion allowing the penstock inspection platform unit 6 to roll down the penstock. As the penstock inspection platform unit 6 is in the penstock inclined portion, its frame 61 has been inclined to have a platform 60 that is level/horizontal. The launching unit 5 is therefore in a fixed position once the system is assembled.

Cables 7, 70, 71 are linking the penstock inspection platform unit 6 to the launching unit 5 and allow to manage the passive descent and the active ascent of the penstock inspection platform unit 6, the latter being obtained by hoists located in the launching unit 5. To avoid the cables 7 rubbing the internal surface of the penstock 3, guide sheave rollers 73 are distributed along the penstock while the cables 7 are unrolled from the hoists. Preferably, as represented, the guide sheave rollers 73 are linked as to form a chain, simplifying the distribution from the upper end of the penstock and, reversely, the collection back to the upper end of the penstock, of the guide sheave rollers 73. The guide sheave rollers 73 maintain the cables 7 above the internal surface of the penstock 3 as shown on FIG. 2.

In the operation state as represented FIGS. 1a, 1b and 2 (note: both states represented), the penstock inspection platform unit 6 is away from the launching unit 5 and the shuttle unit 8 allow operators and equipment, materials to be exchanged between the two 6, 5 without having to hoist/raise back the penstock inspection platform unit 6 on the launching unit 5. The shuttle unit 8 can roll along the penstock 3 thanks to independent suspension line wire ropes 72 attached to the anchor beam 42 and to hoists 80 located on the shuttle unit 8. In another embodiment, the hoists for the shuttle unit 8 are located on the anchor beam side or on the launching unit 5 and/or the independent suspension line wire ropes 72 are attached to the launching unit 5.

In FIG. 2, the parking state corresponds to the case the penstock inspection platform unit 6 is parked on the launching unit 5.

The penstock inspection platform unit 6, the launching unit 5 and the shuttle unit 8 preferably have control panels for controlling the operations of the units and notably the hoists which are electrically driven. It is also possible to implement remote control devices for that purpose, either by radio-waves or wired.

In FIG. 2, the upper end of the penstock is in an edifice 2 comprising a water collecting chamber 21 toward the inclined portion of the penstock 3 and two gate bearing structures 20, 20' (only one 20 represented FIG. 2) on the water supply side 22 of the upper end. It should be understood that the gate towards the water supply side 22 of the upper end of the penstock 3 has been closed tight and that the water in the penstock has been drained away to allow the assembly of the system 1 in the penstock.

An access shaft 23 to the water collecting chamber 21 of the upper end of the penstock 3 allows to enter the penstock from the top of the edifice 2 thanks to a davit 24, a hoist 26 and a and a basket elevator 27. The anchor unit 4 has been inserted and descended in the gate bearing structure 20 adjacent to the water collecting chamber 21 and that forms a vertical rectangular pit allowing to slidingly receive from the top of the edifice 2 and to retain said anchor unit 4.

FIGS. 3 and 4 allow to better visualize the upper end of the penstock with its edifice 2 and the two gate bearing structures 20, 20' arranged serially on a first side of the edifice (we will see that the exemplified penstock has two ingress/supply of water in parallel) The upper end of the penstock, in the collecting chamber 21, is horizontal.

The FIG. 5 shows from the top the specific structure of the exemplified upper end of the penstock with its two ingress/supply of water in parallel and their two gate bearing structures in serial on each of the water supply sides 22, 22' of the upper end of the penstock in the edifice 2 for a total of four two gate bearing structures per penstock. An anchor unit 4 has been introduced in the gate bearing structure 20 on the water supply sides 22. The gate bearing structure 20, 20', 20" that forms a vertical rectangular pit, also forms two lateral grooves 25. The vertical grooves 25 and the vertical plane device (e.g. a gate, a grid or the anchor unit 4 or the girder 9) that can be descended in the gate bearing structure comprise complementary sliding means, represented here as rolling means, which allow to slidingly receive in the gate bearing structure a gate, or the anchor unit, or any other useful device, notably a grid. The represented sliding means are rails located in the grooves and the vertical plane device (e.g. the anchor unit 4), that can be descended down or lifted up from the pit formed by the gate bearing structure, comprises rollers.

Those grooves 25 are more apparent at some height, notably at the height of the penstock and collecting chamber that are open spaces, as the pit from the gate bearing structure is globally rectangular in horizontal cross-section and has a length greater than the width of the penstock at that location.

On the other water supply side 22' a light drawn anchor unit 4' has been represented to show that it could be possible to arrange an anchor unit on the other ingress side but, in general, an anchor unit in one of the two gate bearing structures 20, 20" is sufficient to retain the system. Note that, in some instances, notably because the inclined portion of the penstock if very long and therefore the launching unit 5 and the anchor unit could be subjected to high forces, it is possible to implement a system with two anchor units 4, 4', and in which the two anchor beams are paralleled and fixed together. In another embodiment, a first one of the two anchor units provides the anchor beam 42 and the second one, without an anchor beam, is attached to the anchor beam of the first directly by its telescopic arm.

In other applications, there is only one ingress/supply of water and therefore only one gate bearing structure for a penstock and they are all aligned.

It can be seen from the figures that the penstock 3 inclined portion is not in front of one of the two ingress/supply of water 22, 22' but in the middle of the two. Therefore, the system 1 implement means to adjust the position of the different units between them and also relative to the gate bearing structures 20, 20' and to the penstock inclined portion. The main adjustment is obtained with the anchor unit thanks to its deployable telescopic arm 41 and thanks to the anchor beam 42 which position at the end of the deployable telescopic arm 41 is adjustable, i.e. the end of the deployable telescopic arm 41 can be fixed along the length of the anchor beam at any point between the two extremities of the anchor beam 42. The deployable telescopic arm 41 is rotatable thanks to an electric motor 46. To improve the retaining strength of the anchor beam 42, interlock brace 47 are assembled with the deployable telescopic arm 41.

In addition, in the launching unit 5 which comprises a hoist section 53, a guide sheave section 52 and a launching section 51, the location of the modules constituting the hoist section 53 and the guide sheave section 52 and its pulleys 55 can be located at will to be positioned in front of the inclined portion of the penstock as is also located the launching section 51.

On FIG. 6, the system is in the assembled configuration and in the parking state. The anchor unit 4 is retaining through its deployable telescopic arm 41 and anchor beam 42, the launching unit 5. The penstock inspection platform unit 6 is parked on the launching unit 5 and the cables have been winded by the hoists of the hoist section 53 of the launching unit 5. An access path 54 has been assembled over the guide sheave section 52 of the launching unit 5. A lateral stair gives access to the access path 54 and those areas which are to be used by the operators, as also the one on the penstock inspection platform unit 6, have guardrails and lifelines to protect the operators notably from falling. The operators access the penstock inspection platform unit 6 through the access path 54 on the guide sheave section 52 of the launching unit 5.

The anchor unit 4 which comprises a lifting davit 44 and a walkway 43 on its upper face is also equipped with guardrails and lifelines and the ladders to access the soil of the penstock also have lifelines to which the operators can tie themselves. One can see on the anchor unit 4, an elevator cage 45 that can be descended or lifted from the top of the edifice 2 through the pit formed by the gate bearing structure, for transporting operators and/or goods toward/from the walkway 43. As also visible on FIG. 6, the anchor unit 4 is installed on a girder 9 that has been lowered/descended into the bottom of the pit formed by the gate bearing structure before the anchor unit 4. Therefore, the anchor unit 4 is arranged on a girder 9 at the bottom of the gate bearing structure.

On FIG. 7, the system is not fully assembled: the girder 9 and the anchor unit 4 have been descended in one of the gate bearing structures but the deployable telescopic arm 41 is not deployed and is stored within the width of the anchor unit 4. The other gate bearing structures is closed by a gate. Hoist modules 53' have also been descended through the gate bearing structure and they are temporarily stored aside while the assembly of the launching unit 5 is started, the guide sheave section 52 and the launching section 51 (only the rear part being visible) being on the verge to be assembled and completed (the access path is not yet assembled over the guide sheave section 52 of the launching unit 5).

On FIG. 8, the system has been assembled and the movements of the deployable telescopic arm 41 and of the anchor beam 42 are shown for explanation purposes. Due to the restrained free space, the anchor beam 42 is first rotated out of the width of the anchor unit 4 and then the telescopic arm 41 which can also be extended according to needs to join the hoist section 53 of the launching unit 5.

On FIG. 9, only the launching section 51 of the launching unit 5 that is not completed is shown and it comprises a framework resting on the soil of the collecting chamber 21 and is located at the entrance of the inclined portion of the penstock. The framework is an assembly of metallic profiles which comprises platform guide tracks 56 for receiving the wheels of the penstock inspection platform unit 6 when the latter is parked on the launching unit 5. The framework also comprises shuttle guide tracks 57 for receiving the wheels of the shuttle unit 8. The launching section 51 also comprises two davits 58 that can be used to assemble the hoist section 53 and the guide sheave section 52 that are to be attached, directly or non-directly, to the framework of the launching section 51 and to the anchor beam 42.

One can see on FIGS. 8 and 9, on the rear of the launching section 51, a beam in the median plane of the collecting chamber and that aim and which end rests against a median separation wall between the two ingress/supply of water.

On FIG. 10, the penstock inspection platform unit 6 is parked on the launching section 51 of the launching unit 5 that is not completed. On can see the wheels 62 of the penstock inspection platform unit 6 resting on the platform guide tracks 56 of the launching section 51.

The penstock inspection platform unit 6 comprises a platform 60 which is arranged on a frame 61 that comprises the wheels 62. A hatch access door 65 is arranged on the platform 6 and allow an operator to pass under the platform. The platform 60 of the penstock inspection platform unit 6 is surrounded with guardrail and also comprises lifelines and hard anchor points for the tying of the operators and/or tools or materials.

FIGS. 11 to 14 allow to better understand the structure of the penstock inspection platform unit 6. The wheels 62 are inclined on the frame as to roll flat on the internal surface of the penstock 3 which is circular. The wheels 62 are doubled in that a small diameter wheel is associated to a larger diameter wheel, the larger diameter wheel rolling on the internal surface of the penstock 3. The small diameter wheel may be used to bring the elements that are assembled to build the frame 61 of the penstock inspection platform unit 6 but it is also a security for the assembled penstock inspection platform unit 6, in case the larger diameter wheel would fail as it could still roll with the small wheel. The larger diameter wheel is inserted in the element of the small diameter wheel.

As visible FIG. 14, a linear actuator/jack 64 allows to incline/tilt the frame 61 relative to the platform 60 and a ladder 66 is available under the hatch access door 65. Preferably, lifelines are arranged on the ladder 66 and some parts of the frame 61 to allow operator working under the penstock inspection platform unit 6 to be secured.

A platform chord reeler 63 is arranged on the penstock inspection platform unit 6 and allows the supply of electric power to the penstock inspection platform unit 6 from a source located upward, in the upper end of the penstock or even outside of the edifice 2. A control panel 67 is also arranged on the platform 60. In the exemplified embodiment, the control panel 67 notably allows wired remote control of the hoists located in the launching unit 5 through a control cable and a control cable reeler 68 is also arranged on the penstock inspection platform unit 6. In another embodiment remote control is done with radioelectric means/radio-waves.

FIGS. 15 and 16 show more specifically the hoist section 53 and the guide sheave section 52 when assembled in relation to the anchor beam 42 of the anchor unit 4. The hoist section 53 and the guide sheave section 52 respectively result from the assembly of hoist modules 53' and of guide sheave modules 52'. The hoist section 53 is attached to the anchor beam 42 and the guide sheave section 52 is attached to the hoist section 53 and, not represented FIGS. 15 et 16, the launching section 51 is attached to the guide sheave section 52. The anchor beam 42 rests on feet 48 which are preferably located at both ends of the anchor beam 42. The feet 48 can be retractable and/or telescopic or removable from the anchor beam and therefore installed when required.

As visible FIG. 17, the penstock inspection platform unit 6 is linked to the launching unit 5 and to the anchor beam 42 of the anchor unit 4 with four cables allowing to move the penstock inspection platform unit 6 along the penstock. The resulting structure is symmetrical with four cables that forms loops at the penstock inspection platform unit 6. A given cable first end is attached to a hoist of the hoist section 53, forms a deploy line 70, loop on the penstock inspection platform unit 6 on a sheave, forms a return line 71 and its second end is attached to the anchor beam 42.

In such an embodiment of the guide sheave section in which each hoist line and return line pair is symmetrical, the net effect is that all external lateral forces cancel each other. This allows the sheave system of the guide sheave section, to not require any significant rigid connections to the ground when in use. The internal lateral forces are supported by the structure of the hoist frame modules itself.

Preferably, the guide sheave section 52 is attached to the hoist section 53 but this may be not the case in particular installations.

Preferably, each hoist modules of the hoist section that is attached to the anchor beam comprises carters enclosing the hoist motors.

The four hoists for the penstock inspection platform unit 6 may be operated simultaneously or not, to move up or leave going down the penstock inspection platform unit 6 along the inclined portion of the penstock 3. In fact, the cables, and the hoists for the penstock inspection platform unit 6 are redundant as a security measure. The sheaves in the guide sheave section 52, are arranged such that all side loads transmitted by the cables are cancelled. Practically, either the Inner or Outer hoist can be operated, the other is a redundant backup. For travelling down the penstock, the redundant hoist simply keeps the wire rope slightly slack. For travel up the penstock, the redundant hoist just winds in the slack wire. If the primary hoist fails, the redundant hoist is there to support the platform.

The shuttle unit 8 shown on FIGS. 18 and 19 is attached to the anchor beam 42 with four independent suspension line wire ropes 72. The hoists 80 for moving the shuttle unit 8 are located on the shuttle unit 8. The hoist 80 are electric hoists. The shuttle unit 8 comprises a supporting frame 82 comprising wheels 84 that are inclined to roll flat on the internal surface of the penstock 3 which is circular. The shuttle unit 8 comprises a lifeline. A deck board 81 surrounded with guardrails is arranged on the supporting frame 82 of the shuttle unit 8. The deck board 81 is inclinable/tiltable on the supporting frame 82 of the shuttle unit 8 to have a deck board 81 that is horizontal when the shuttle unit 8 is in the inclined portion of the penstock 3. The inclination/tilting of the shuttle deck board 81 is operated thanks to manual hand winches 83 that are duplicated. In another embodiment, the winches 83 are electrically operated. The electric supply is provided thanks to an electric wire that is extended (when the shuttle unit moves down the penstock) or retracted (when the shuttle unit moves up the penstock) between the shuttle unit 8 and the upper end of the penstock. A control panel is arranged in the shuttle unit 8. The deck board 81 is a non-slip aluminum floor as are the other platforms and pathways of the system 1.

On FIG. 20, a detailed view of the access shaft 23 with the davit 24, its hoist 26 and basket elevator 27 is given. Operator(s) and/or material(s) may be passed through the access shaft toward/from the water collecting chamber. As for other dangerous areas, guardrails are arranged around the area and may comprise lifelines. To which operators may tie themselves.

Preferably, the elements constituting the units are made of rust proof or resisting materials, notably hot dip galvanized steel and aluminum. Preferably, the assembly and joining of the different elements of the system is done with fast connecting means, i.e. clipping, pin fixation, snap fit, carabiner for example, where possible and, if not possible, screws and bolts are used. It has to be recalled that the system has to be dismountable and reusable and permanent connecting means such as welding should be avoided.

The electric circuits are waterproof and electric protections are implemented. Some parts of the electric circuits may use low voltage, typically under 60 V, and notably for the wired remote control.

We will now explain how the system may be used to inspect and/or maintain a penstock of a hydroelectric plant.

The elements used to assemble the system are initially in a dismounted configuration with some of them in the form of preconfigured modules and other in the form of individual elements possibly with some minor preassembly. In all cases, those elements each have a shape and volume that allow it to pass through the pit formed by a gate bearing structure 20 of the edifice 2 at the upper end of the penstock 3. The elements are provided to be able to assemble in the penstock, preferably in an enlarged part of it, within a collecting chamber that is horizontal, the units used in the system. The units that are to be assembled from scratch are the launching unit 5 and the penstock inspection platform unit 6. The anchor unit 4 in the dismounted configuration is almost ready to use/operational, only minor elements having to be fixed to it, for example a davit, or moved and positioned in a working/operation position, for example collapsible guardrails.

If a vertical plane device, e.g. a gate, a grid, is occupying the gate bearing structure foreseen for passing the elements, this device is extracted from the gate bearing structure. Of course, the penstock is closed at its ingress/water supply side and has been drained and is free of water and will remain as such during the inspection and maintenance, while the system is present in the penstock.

A girder 9 is first descended at the bottom of the gate bearing structure 20 and then the anchor unit 4. Preferably, an operator may have been descended in a basket elevator 27, through the access shaft 23, in the water collecting chamber 21 at least to check the operations from the bottom of the water collecting chamber 21.

Once the anchor unit 4 is in place in the penstock and it has been completed to be operational, the operators can use it to access and leave the penstock through the gate bearing structure 20. The other elements of the system, still in the dismounted configuration, can be then descended through the gate bearing structure 20. However, it may be preferable to descend some of the elements through the gate bearing structure 20 before the girder 9 and the anchor unit 4 are descended and this could be the case for the hoist frame modules 53' and the guide sheave frame modules 52' as they comprises rollers and that they can be easily rolled in the collecting chamber once descended. Some of the individual elements of a particularly wide extension may also be descended before the girder and the anchor unit are descended.

The descended elements are then assembled to build the launching unit and the penstock inspection platform unit that are connected together and to the anchor beam that has been deployed. Cables, wires, and other elements are also assembled. An electric power supply line is also arranged between the penstock and the top of the edifice where a diesel electric generator 28 is installed (FIG. 3).

At the end of the assembly, the system is in the parking state where the penstock inspection platform unit is parked on the launching unit that is in the horizontal portion of the penstock just at the entrance of the inclined portion of the penstock as to allow the penstock inspection platform unit to be launched in the inclined portion of the penstock and to descend/roll down under the force of gravity, in the operation state.

When the penstock inspection platform unit is away from the launching unit, the cables linking the penstock inspection platform unit on one side and the launching unit+anchor unit on the other side, are supported on guide sheave rollers along and above the surface of the penstock. The guide sheave rollers are preferably automatically launched in relation to the length of the unwinding of the cables. Conversely, when the penstock inspection platform unit is moved back toward the launching unit, the guide sheave rollers are preferably automatically recovered.

As the penstock inspection platform unit is a sensibly large and heavy piece of equipment, it is preferable not to move it too frequently and this is why a shuttle unit is implemented between the penstock inspection platform unit and the launching unit. Thanks to it, in the case of a shift of operators or need of material or of tools, it is not necessary to move the penstock inspection platform unit back on the launching unit, the shuttle allowing exchanges of operators and/or material or tools.

The removal of the system is done with the dismounting of the system and the output from the penstock of the dismounted elements and of the anchor unit and of the girder.

The invention may be extended with more than one penstock inspection platform unit 6 that can be parked on the launching platform and sent into the inclined portion of the penstock, the size of the launching section 51 and/or the size of the penstock inspection platform units being adapted accordingly. To command the movements of the penstock inspection platform units independently from one to another, similar structure with cables and hoist is duplicated, triplicated . . . according to the number of the penstock inspection platform units. In another embodiment, only the closest/highest penstock inspection platform unit is operated with cables and hoist from the launching unit and each of the other ones down is operated by the adjacent one higher along the penstock that therefore comprises hoists and cables. In all cases, the penstock inspection platform units are operated serially/sequentially along the penstock and it is not possible for a penstock inspection platform unit to pass another one. Preferably, anti-colliding and overload detection systems are implemented.

The invention claimed is:

1. Penstock internal maintenance system adapted for an inclined penstock of an hydroelectric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at two lateral edges of the vertical plane device in two vertical lateral grooves of the gate bearing structure, wherein the system comprises a set of units that are assembled together to form an assembled configuration of the system and separated in a dismounted configuration of the system, said units comprising an anchor unit, a launching unit, and a penstock inspection platform unit, the units in the dismounted configuration being configured to enter the penstock from the top of the edifice or, reversely leave the penstock, through the gate bearing structure adjacent to the water collecting chamber, when the eventual vertical plane device has been removed from the gate bearing structure, the units being assembled together when located in the penstock to obtain the assembled configuration, the anchor unit being further configured to be slidingly received and retained in the gate bearing structure adjacent to the water collecting chamber when the eventual vertical plane device has been removed from the gate bearing structure, the anchor unit having two lateral edges being guided and retained in the two vertical lateral grooves of the gate bearing structure, in the assembled configuration of the system, the penstock inspection platform unit being parked on the launching unit when in a parking state and the penstock inspection platform unit being away of the launching unit, down the penstock, when in an operation state, the penstock inspection platform unit being linked to the anchor unit through the launching unit with cables allowing the penstock inspection platform unit to move away passively along the slope of the penstock by unwinding the cables or, reversely, move toward the launching unit by winding the cables, and wherein the launching unit is fastened to the anchor unit.

2. The penstock internal maintenance system according to claim 1, wherein the anchor unit is an integral unit and each of the launching unit and of the penstock inspection platform unit is made of separate elements in the dismounted configuration of the system.

3. The penstock internal maintenance system according to claim 1, wherein the penstock inspection platform unit comprises rollers configured to roll on the internal surface of the penstock when in operation state and to roll and rest on rolling guides of the launching unit in the parking state.

4. The penstock internal maintenance system according to claim 3, wherein the rolling guides of the launching unit are hinged and can be set in at least two positions, an horizontal position and an inclined position, the horizontal position corresponding to the parking state and the inclined position allowing the penstock inspection platform unit to leave passively the launching unit toward the inclined penstock or to return on the launching unit from the inclined penstock.

5. The penstock internal maintenance system according to claim 3, wherein the penstock inspection platform unit comprises a platform resting on at least three feet, the feet being adjustable to keep the platform sensibly level/horizontal in the parking state or in the operation state.

6. The penstock internal maintenance system according to claim 3, wherein the penstock inspection platform unit comprises a platform resting on a supporting frame comprising the rollers of the penstock inspection platform unit and the frame is inclinable relative to the platform to keep the platform sensibly level/horizontal in the parking state or in the operation state.

7. The penstock internal maintenance system according to claim 1, wherein in the operation state, the cables linking the penstock inspection platform unit and the launching unit are resting on guide sheave rollers to avoid the cables rubbing against penstock internal surface.

8. The penstock internal maintenance system according to claim 1, wherein the system further comprises a shuttle platform unit linked with independent suspension line wire ropes to at least the launching unit and capable of moving between the penstock inspection platform unit and the launching unit when the system is in operation state.

9. The penstock internal maintenance system according to claim 8, wherein the shuttle platform unit comprises a telescopic leveling system.

10. The penstock internal maintenance system according to claim 1, wherein the anchor unit comprises a deployable telescopic arm terminated by an anchor beam, cables and the launching unit being attached to the anchor beam in the assembled configuration of the system.

11. The penstock internal maintenance system according to claim 10, wherein the deployable telescopic arm and the anchor beam of the anchor unit are retracted within the width of the anchor unit in the dismounted configuration of the system.

12. The penstock internal maintenance system according to claim 10, wherein the launching unit comprises a hoist section and a launching section connected together in the assembled configuration of the system, the hoist section being attached to the anchor beam.

13. The penstock internal maintenance system according to claim 10, wherein the launching unit comprises a hoist section, a guide sheave section and a launching section connected together the assembled configuration of the system, the hoist section being attached to the anchor beam, and the guide sheave section is connected to the hoist section and the launching section is connected to the guide sheave section.

14. The penstock internal maintenance system according to claim 13, wherein the hoist section comprises electric winders for winding and unwinding the cables and the guide sheave section comprises pulleys whose locations are adjustable in order to adjust the position of the cables relative to the penstock inclined section.

15. The penstock internal maintenance system according to claim 13, wherein in each of the guide sheave module of the hoist section the cables are arranged by pairs with in each pair a hoisted cable and a return cable for a total of four cables across each guide sheave module and wherein the four cables are arranged symmetrically within the guide sheave module.

16. Process of assembling a penstock internal maintenance system from a dismounted configuration of the system in order to obtain an assembled configuration of the system, wherein the penstock internal maintenance system is according to claim 1 and in which the system comprises a set of units that are assembled together to form an assembled configuration of the system and separated in a dismounted configuration of the system, said units comprising an anchor unit, a launching unit and a penstock inspection platform unit, the penstock being an inclined penstock of an hydroelectric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at its two lateral edges in two vertical lateral grooves of the gate bearing structure, wherein if present, the vertical plane device is first removed from the gate bearing structure adjacent to the water collecting chamber, and wherein the anchor unit, the launching unit and the penstock inspection platform unit are entered from the top of the edifice in the penstock through the gate bearing structure adjacent to the water collecting chamber, the anchor unit being further configured to be slidingly received and retained in the gate bearing structure, the anchor unit having two lateral edges being guided and retained in the two vertical lateral grooves of the gate bearing structure, wherein the launching unit is fastened to the anchor unit and the penstock inspection platform unit is parked on the launching unit, the penstock inspection platform unit being linked to the anchor unit through the launching unit with cables allowing the penstock inspection platform unit to move away passively along the slope of the penstock by unwinding the cables or, reversely, move toward the launching unit by winding the cables.

17. Anchor unit for a penstock internal maintenance system adapted for the maintenance of an inclined penstock of an hydroelectric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at two lateral edges of the vertical plane device in two vertical lateral grooves of the gate bearing structure, the system comprises a set of units including the anchor unit that are assembled together to form an assembled configuration of the system and separated in a dismounted configuration of the system, the anchor unit in the dismounted configuration being configured to enter the penstock from the top of the edifice or, reversely leave the penstock, through the gate bearing structure adjacent to the water collecting chamber when the eventual vertical plane device has been removed from the gate bearing structure, the anchor unit being further configured to be slidingly received and retained in the gate bearing structure adjacent to the water collecting chamber, the anchor unit having two lateral edges being guided and retained in the two vertical lateral grooves of the gate bearing structure, and wherein the anchor unit comprises a deployable telescopic arm terminated by an anchor beam, the deployable telescopic arm and the anchor beam of the anchor unit being retracted within the width of the anchor unit in the dismounted configuration of the system.

18. Process of assembling a penstock internal maintenance system from a dismounted configuration of the system in order to obtain an assembled configuration of the system, wherein the penstock internal maintenance system is according to claim 2 and in which the system comprises a set of units that are assembled together to form an assembled configuration of the system and separated in a dismounted configuration of the system, said units comprising an anchor unit, a launching unit and a penstock inspection platform unit, the penstock being an inclined penstock of an hydro-electric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at two lateral edges of the vertical plane device in two vertical lateral grooves of the gate bearing structure, wherein if present, the vertical plane device is first removed from the gate bearing structure adjacent to the water collecting chamber, and wherein the anchor unit, the launching unit and the penstock inspection platform unit are entered from the top of the edifice in the penstock through the gate bearing structure adjacent to the water collecting chamber, the anchor unit being further configured to be slidingly received and retained in the gate bearing structure, the anchor unit having two lateral edges being guided and retained in the two vertical lateral grooves of the gate bearing structure, wherein the launching unit is fastened to the anchor unit and the penstock inspection platform unit is parked on the launching unit, the penstock inspection platform unit being linked to the anchor unit through the launching unit with cables allowing the penstock inspection platform unit to move away passively along the slope of the penstock by unwinding the cables or, reversely, move toward the launching unit by winding the cables.

19. Process of assembling a penstock internal maintenance system from a dismounted configuration of the system in order to obtain an assembled configuration of the system, wherein the penstock internal maintenance system is according to claim 3 and in which the system comprises a set of units that are assembled together to form an assembled configuration of the system and separated in a dismounted configuration of the system, said units comprising an anchor unit, a launching unit and a penstock inspection platform unit, the penstock being an inclined penstock of an hydro-electric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at two lateral edges of the vertical plane device in two vertical lateral grooves of the gate bearing structure, wherein if present, the vertical plane device is first removed from the gate bearing structure adjacent to the water collecting chamber, and wherein the anchor unit, the launching unit and the penstock inspection platform unit are entered from the top of the edifice in the penstock through the gate bearing structure adjacent to the water collecting chamber, the anchor unit being further configured to be slidingly received and retained in the gate bearing structure, the anchor unit having two lateral edges being guided and retained in the two vertical lateral grooves of the gate bearing structure, wherein the launching unit is fastened to the anchor unit and the penstock inspection platform unit is parked on the launching unit, the penstock inspection platform unit being linked to the anchor unit through the launching unit with cables allowing the penstock inspection platform unit to move away passively along the slope of the penstock by unwinding the cables or, reversely, move toward the launching unit by winding the cables.

20. Process of assembling a penstock internal maintenance system from a dismounted configuration of the system in order to obtain an assembled configuration of the system, wherein the penstock internal maintenance system is according to claim 4 and in which the system comprises a set of units that are assembled together to form an assembled configuration of the system and separated in a dismounted configuration of the system, said units comprising an anchor unit, a launching unit and a penstock inspection platform unit, the penstock being an inclined penstock of an hydro-electric plant, the penstock comprising an upper end for intaking water from a supply of water and, opposite, a lower end for delivering water, the upper end arranged in an edifice comprising a water collecting chamber on a chamber side of the upper end and at least one gate bearing structure on a water supply side of the upper end, the gate bearing structure allowing a gate to close the intake of water when the gate is in closed position, at least the gate bearing structure adjacent to the water collecting chamber forming a vertical pit adapted to slidingly receive from the top of the edifice and to retain a vertical plane device guided and retained at two lateral edges of the vertical plane device in two vertical lateral grooves of the gate bearing structure, wherein if present, the vertical plane device is first removed from the gate bearing structure adjacent to the water collecting chamber, and wherein the anchor unit, the launching unit and the penstock inspection platform unit are entered from the top of the edifice in the penstock through the gate bearing structure adjacent to the water collecting chamber, the anchor unit being further configured to be slidingly received and retained in the gate bearing structure, the anchor unit having two lateral edges being guided and retained in the two vertical lateral grooves of the gate bearing structure, wherein the launching unit is fastened to the anchor unit and the penstock inspection platform unit is parked on the launching unit, the penstock inspection platform unit being linked to the anchor unit through the launching unit with cables allowing the penstock inspection platform unit to move away passively along the slope of the penstock by unwinding the cables or, reversely, move toward the launching unit by winding the cables.

\* \* \* \* \*